(12) United States Patent
Masuzawa

(10) Patent No.: US 8,373,652 B2
(45) Date of Patent: Feb. 12, 2013

(54) IMAGE DISPLAY APPARATUS AND IMAGE DISPLAY METHOD

(75) Inventor: Takashi Masuzawa, Otawara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 1206 days.

(21) Appl. No.: 11/393,907

(22) Filed: Mar. 31, 2006

(65) Prior Publication Data

US 2006/0228012 A1 Oct. 12, 2006

(30) Foreign Application Priority Data

Apr. 6, 2005 (JP) ................................ P2005-109842

(51) Int. Cl.
*G09G 5/00* (2006.01)
(52) U.S. Cl. ...................................................... 345/156
(58) Field of Classification Search ................. 378/4
See application file for complete search history.

(56) References Cited

U.S. PATENT DOCUMENTS

| | | | | |
|---|---|---|---|---|
| 6,141,398 A * | 10/2000 | He et al. | ............................ | 378/4 |
| 6,243,438 B1 * | 6/2001 | Nahaliel et al. | ................. | 378/19 |
| 6,275,562 B1 * | 8/2001 | He et al. | .......................... | 378/19 |
| 6,396,897 B1 * | 5/2002 | Ebrahimifard et al. | ........... | 378/4 |
| 6,404,841 B1 * | 6/2002 | Pforr et al. | ........................ | 378/4 |
| 6,424,692 B1 * | 7/2002 | Suzuki | .............................. | 378/4 |
| 6,522,712 B1 * | 2/2003 | Yavuz et al. | ....................... | 378/4 |
| 6,526,117 B1 * | 2/2003 | Okerlund et al. | ................. | 378/8 |
| 6,885,764 B2 * | 4/2005 | Wang et al. | ................... | 382/131 |
| 7,119,841 B1 * | 10/2006 | Sako | ......................... | 348/333.05 |
| 7,436,924 B2 * | 10/2008 | Takahashi et al. | ................ | 378/4 |
| 2003/0097063 A1 * | 5/2003 | Wang et al. | .................... | 600/425 |
| 2003/0156745 A1 * | 8/2003 | Saito et al. | ..................... | 382/128 |
| 2004/0017881 A1 * | 1/2004 | Cesmeli et al. | .................... | 378/4 |
| 2004/0116797 A1 * | 6/2004 | Takahashi et al. | ............ | 600/407 |
| 2004/0161139 A1 * | 8/2004 | Samara et al. | ................ | 382/131 |

FOREIGN PATENT DOCUMENTS

| | | |
|---|---|---|
| JP | 10-52423 | 2/1998 |
| JP | 3142373 | 12/2000 |
| JP | 2002-85355 | 3/2002 |
| JP | 2004-188002 | 7/2004 |

OTHER PUBLICATIONS

Japanese Office Action dated Mar. 13, 2012, in Japanese Patent Application No. 2006-083406.

* cited by examiner

*Primary Examiner* — Edward Martello
(74) *Attorney, Agent, or Firm* — Oblon, Spivak, McClelland, Maier & Neustadt, L.L.P.

(57) ABSTRACT

An image display apparatus comprises a reference image display unit, a setting unit, an image generating unit and a tomographic image display unit. The reference image display unit displays a reference image on a display unit. The setting unit sets a display range of tomographic images in a first direction and either of a number of the tomographic images in the first direction to be displayed or a thickness of the tomographic images in the first direction, to image data corresponding to a plurality of slices. The image generating unit generates either of the tomographic images having the set thickness in the first direction or the set number of the tomographic images in the first direction using image data corresponding to a plurality of slices in the display range. The tomographic image display unit displays the generated tomographic images.

44 Claims, 12 Drawing Sheets

| REGION | SLICE THICKNESS |
|---|---|
| HEAD | 2mm |
| CHEST | 10mm |
| LIVER | 5mm |

IMAGE DISPLAY APPARATUS AND IMAGE DISPLAY METHOD

BACKGROUND OF THE INVENTION

1. Field of the Invention

The present invention relates to an image display apparatus and an image display method for displaying image data acquired by an image diagnostic apparatus such as an X-ray CT (computed tomography) apparatus, and more particularly, to an image display apparatus and an image display method which can generate image data of a desired portion with an appropriate resolution and display form efficiently to be displayed.

2. Description of the Related Art

An X-ray CT apparatus is one of image diagnostic apparatuses in the medical field (see, for example, Japanese Patent Application (Laid-Open) No. 2000-139897). The X-ray CT apparatus is mainly connected to a 3D-WS (three-dimensional workstation) for performing image processing of an obtained X-ray CT image, an image server for storing images, and an image display apparatus for displaying the images to be capable of communicating data with each other via an image display network, and forms an X-ray CT image diagnostic display system. A system including the image display apparatus and the image server is called a medical PACS (picture archiving and communication system).

FIG. 15 is a block diagram of a conventional X-ray CT image diagnostic display system.

An X-ray CT image diagnostic display system 1 includes: an X-ray CT apparatus 2; a 3D workstation 3; an image server 4, serving as an image storage apparatus; and an image display apparatus 5, serving as an image viewer.

The X-ray CT apparatus 2 performs the scan operation, and a detector 6 detects X rays which are exposed from an X-ray tube (not shown) and pass through an object. After that, a raw data storage unit 7 stores the X-ray data, as raw data. An image reconstructing unit 8 reads the raw data stored in the raw data storage unit 7 and performs image reconstruction processing of the read raw data. Thus, cross-sectional data (hereinafter, referred to as slice image data) is generated and is written to a reconstructed image storage unit 9. Herein, with a 3D image generating unit 10, a user, e.g., an engineer generates relatively simple 3D image data including an MPR (multi-planar reconstruction) image and an MIP (maximum intensity projection) image from the slice image data, as needed. The generated 3D image data is written to and is stored to the reconstructed image storage unit 9.

Subsequently, the slice image data and the 3D image data is transmitted to the image server 4 and the 3D workstation 3 from the reconstructed image storage unit 9 via a communication unit 11 and a network 12. A communication unit 13 in the 3D workstation 3 receives thin-slice image data generated by the X-ray CT apparatus 2, and the received thin-slice image data is written to and is stored to a 3D image storage unit 14. Further, a 3D image generating unit 15 generates, from the thin-slice image data, relatively advanced 3D image data, such as VR (volume rendering) image data, SSD (surface shaded display) image data, and VE (virtual endoscopy) image data. The generated 3D image data is written to and is stored to the 3D image storage unit 14. Further, a display unit 16 displays the thin-slice image data and the 3D image data.

Note that the thin-slice image data corresponds to a slice image with such a thickness that an XY planar resolution of the image is approximately equal to the Z direction (thickness). The above-mentioned image pixel can be used as isotropic voxel and is therefore suitable to the 3D image processing. It is assumed that image data of the slice image of about 0.5 mm to 2 mm is used as the thin-slice image data.

Further, the above-generated 3D image data is transmitted to the image server 4 via the communication unit 13 and the network 12. A communication unit 17 in the image server 4 receives the slice image data and the 3D image data transmitted from the X-ray CT apparatus 2 and the 3D image data transmitted from the 3D workstation 3. The received slice image data and 3D image data is written to and is stored to an image storage unit 18. A recording unit 19 reads the image data stored in the image storage unit 18, as needed. The read data is recorded to a recording medium 20. In this case, administration information, e.g., a recording history of the image data is transmitted to an administration unit 21. The administration unit 21 administrates the image data stored in the image storage unit 18 and the image data recorded to the recording medium 20 from the recording unit 19.

Subsequently, an input unit 22 in the image display apparatus 5 inputs a retrieving request and a transmitting request of the image data. The retrieving request and the transmitting request are transmitted to the administration unit 21 in the image server 4 via a communication unit 23 and the network 12. Therefore, the administration unit 21 reads desired image data from the image storage unit 18 and transmits the image data to the communication unit 17, thereby transmitting the image data to the image display apparatus 5.

The communication unit 23 in the image display apparatus 5 receives the slice image data transmitted form the image server 4, and transmits the received slice image data to a display unit 24. As a consequence thereof, the display unit 24 displays the slice image in a tile or stack format which is used for interpretation.

Mainly, the image display apparatus 5 for interpretation uses such a 2D viewer that the image data received from the image server 4 is simply arranged as mentioned above, or is browsed and is displayed. Recently, the image display apparatus 5 for interpretation frequently uses a viewer with a 3D function for generating 3D image data.

Further, a large number of pieces of the slice image data is recently subjected to MPR processing with the 3D workstation 3, a coronal tomographic image (coronal image) and a sagittal image are thus generated, and 3D processing, such as MIP processing, is performed. In addition, the efficiency and quality of diagnosis is improved with clinical analysis application for the clinical analysis, such as the analysis of the coronary-artery and the analysis of the heart function based on the 3D processing technology.

Data with high resolution, that is, a large amount of the thin slice data is necessary for generation of a 3D image, e.g., an MPR image with high image quality and for clinical analysis with high precision. However, the generation and storage of a large amount of the slice data results in the consumption of a large amount of disk resource of the image display apparatus 5 and the image server 4. This is not preferable in view of costs.

In order to solve the problem, in the imaging operation for the purpose other than that of generating the 3D image, the X-ray CT apparatus 2 outputs only the thick slice data and the MPR image and the only affected part is used as the thin slice data. However, the method is performed on the basis of engineer's determination in the imaging operation. Therefore, there is a problem that causes a danger in which a doctor cannot refer to the image data with necessary precision in the interpretation.

Further, in the interpreting technique of the CT image, the diagnostics based on the axial image has been established for a long time. The MPR image and the 3D image are used as images that support the diagnosis and, finally, the diagnosis is necessarily performed on the basis of the slice data. However, the conventional image display method has a large number of images of the slice data and, therefore, there is a danger of the deterioration in efficiency of the interpretation.

In particular, the number of rows recently increases in the multi-slice CT apparatus, and a numerous amount of image data is generated. Therefore, a method for efficiently displaying an image of a desired portion with a proper resolution and a proper display form is required. However, in order to efficiently use data communication resource and data storage resource, unnecessary generation of the slice data needs to be prevented.

SUMMARY OF THE INVENTION

The present invention has been made in light of the conventional situations, and it is an object of the present invention to provide an image display apparatus and an image display method which can generate image data of a desired portion from less image data included in image data acquired by an image diagnostic apparatus such as an X-ray CT apparatus with an appropriate resolution and display form efficiently to be displayed.

The present invention provides an image display apparatus comprising: a reference image display unit configured to display a reference image on a display unit; a setting unit configured to setup a display range of tomographic images in a first direction and either of a number of the tomographic images in the first direction to be displayed or a thickness of the tomographic images in the first direction, to three-dimensional image data including image data corresponding to a plurality of slices in accordance with instruction information from an input unit and the reference image; an image generating unit configured to generate either of the tomographic images having the set thickness in the first direction or the set number of the tomographic images in the first direction using image data corresponding to a plurality of slices in the display range; and a tomographic image display unit configured to display the generated tomographic images in the first direction, in an aspect to achieve the object.

The present invention also provides an image display apparatus comprising: a reference image display unit configured to display a reference image on the display unit; a observation range designating unit configured to designate a display range of tomographic images in a first direction to the display unit in accordance with instruction information from the input unit and the reference image; a number-of-image designating unit configured to designate either of a number of the tomographic images in the first direction to be displayed or a thickness of the tomographic images in the first direction in accordance with other instruction information from the input unit; and a slab image generating unit configured to display the tomographic images in the first direction by generating slab image data having a required thickness so as to generate either of tomographic image data having the thickness designated by the number-of-image designating unit or the number designated by the number-of-image designating unit of tomographic image data in the first direction in the display range using image data corresponding to a plurality of slices in the display range and giving the generated slab image data to the display unit, in an aspect to achieve the object.

The present invention also provides an image display method comprising steps of: displaying a reference image on a display unit; setting a display range of tomographic images in a first direction and either of a number of the tomographic images in the first direction to be displayed or a thickness of the tomographic images in the first direction, to three-dimensional image data including image data corresponding to a plurality of slices in accordance with instruction information from an input unit and the reference image; generating either of the tomographic images having the set thickness in the first direction or the set number of the tomographic images in the first direction using image data corresponding to a plurality of slices in the display range; and displaying the generated tomographic images in the first direction, in an aspect to achieve the object.

The present invention also provides an image display method comprising steps of: displaying a reference image on a display unit; designating a display range of tomographic images in a first direction to the display unit in accordance with instruction information from an input unit and the reference image; designating either of a number of the tomographic images in the first direction to be displayed or a thickness of the tomographic images in the first direction in accordance with other instruction information from the input unit; and displaying the tomographic images in the first direction by generating slab image data having a required thickness so as to generate either of tomographic image data having the designated thickness or the designated number of tomographic image data in the first direction in the designated display range using image data corresponding to a plurality of slices in the designated display range and giving the generated slab image data to the display unit, in an aspect to achieve the object.

The image display apparatus and the image display method according to the present invention as described above make it possible to generate image data of a desired portion from less image data included in image data acquired by an image diagnostic apparatus such as an X-ray CT apparatus with an appropriate resolution and display form efficiently to be displayed.

DESCRIPTION OF THE PREFERRED EMBODIMENTS

An image display apparatus and an image display method according to embodiments of the present invention will be described with reference to the accompanying drawings.

Figure 1:
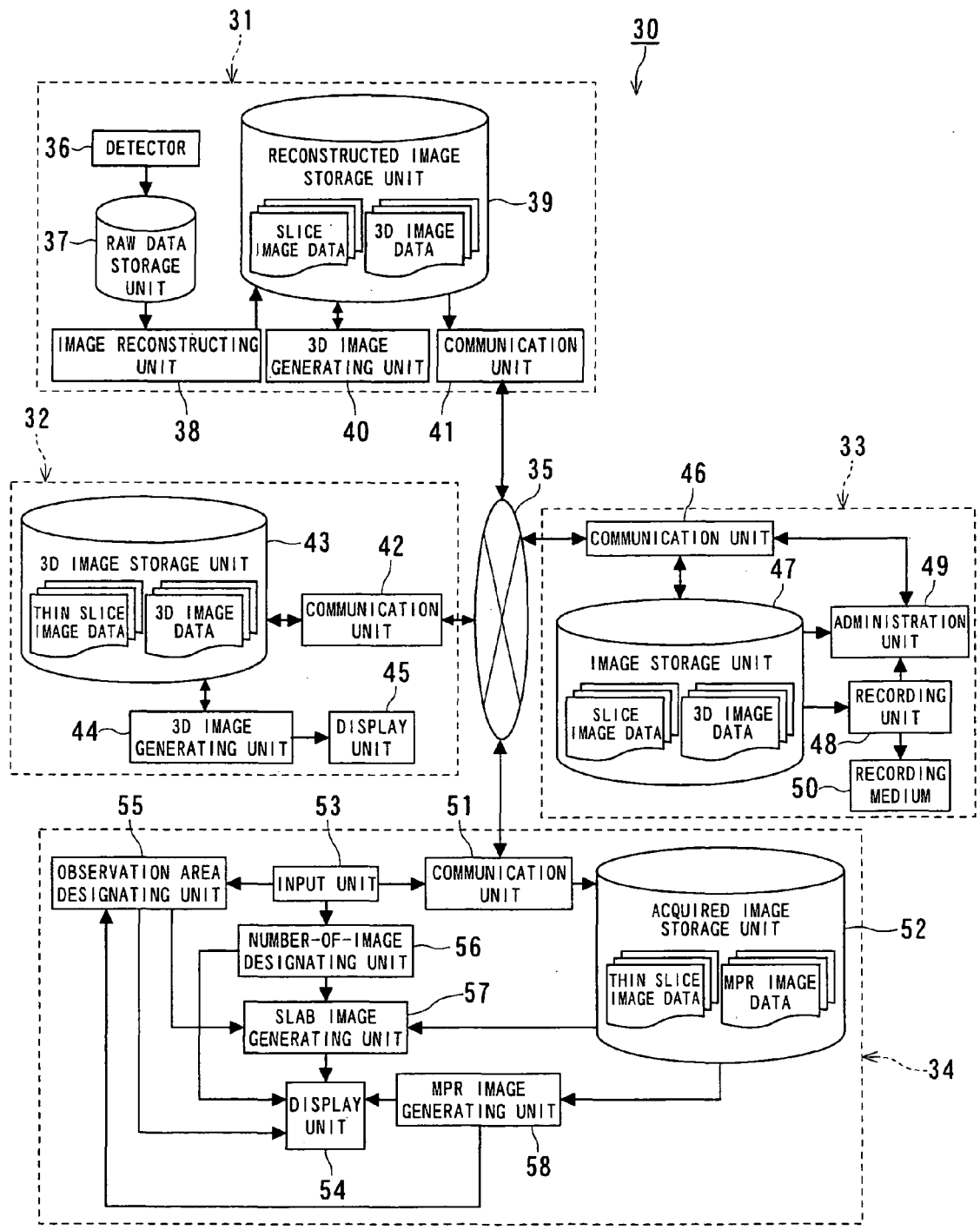
FIG. 1 is a block diagram showing an X-ray CT image diagnostic display system including an image display apparatus according to a first embodiment of the present invention.

FIG. 1 is a block diagram showing an X-ray CT image diagnostic display system including an image display apparatus according to a first embodiment of the present invention.

An X-ray CT-image diagnostic display system 30 includes an X-ray CT apparatus 31, a 3D workstation 32; an image server 33 and an image display apparatus 34. The X-ray CT apparatus 31, the 3D workstation 32, the image server 33 and the image display apparatus 34 are mutually connected via a network 35.

The X-ray CT apparatus 31 includes a detector 36, a raw data storage unit 37, an image reconstructing unit 38, a reconstructed image storage unit 39, a 3D image generating unit 40 and a communication unit 41.

The detector 36 has a function for collecting raw data by detecting X-rays which are exposed from an X-ray tube (not shown) with scan operation and pass through an object and by generating the raw data, and a function for writing the collected raw data to the raw data storage unit 37.

Therefore, the raw data storage unit 37 stores the raw data. The raw data storage unit 37 includes a recording medium, such as a disk, or a recording device.

The image reconstructing unit 38 has a function for generating slice image data, as axial image, from the raw data by reading the raw data stored in the raw data storage unit 37 and by performing image reconstruction processing and a function for writing the generated slice image data to the reconstructed image storage unit 39.

Therefore, the reconstructed image storage unit 39 stores slice image data. The reconstructed image storage unit 39 can include a recording medium, such as a disk, or a recording device. Herein, upon generating the slice image data, parameters including the imaging position (portion), slice thickness, scaling rate, and FOV (field of view) are given, and the slice image data is generated in accordance with the parameters. In the general examination, the parameter is determined depending on an imaging condition, such as a preset depending on the portion, and the slice image data is continuously generated.

In general, the slice image data with a slice thickness of 0.5 mm to 2 mm is referred to as thin-slice image data, and the slice image data with a slice thickness over 2 mm is referred to as thick-slice image data. The slice thickness of the thick-slice image data is normally 10 mm or less.

Recently, the high performance of the X-ray CT apparatus 31 reduces the scan time and improves the resolution of the image. For example, such the X-ray CT apparatus 31 is used that an image of the upper body of an object can be entirely obtained for 20 sec and the obtained image data can be output as thin-slice image data. Note that, when one piece of image data is composed with a plurality of pieces of slice image data (i.e., image data corresponding to a plurality of slices) with a slice thickness of 0.5 mm, the number of pieces of the slice image data is about 1,200.

The 3D image generating unit 40 has: a function for reading the slice image data from the reconstructed image storage unit 39 and generating the 3D image data; and a function for writing the generated 3D image data to the reconstructed image storage unit 39. The 3D image data includes coronal image data, serving as a tomographic image, MPR image data, such as sagittal image data, MIP image data, MinIP (minimum intensity projection) image data, slab image data, VR image data, SSD image data, and VE image data. Further, a function for reconstructing the 3D image data from the axial image data (slice image data) is referred to as a 3D function.

Recently, the X-ray CT apparatus 31 has the above-mentioned 3D function for easily generating a 3D image with a console, thereby generating an MPR image or an MIP image.

The communication unit 41 has a function for reading the slice image data and the 3D image data from the reconstructed image storage unit 39 and transmitting the read image data via the network 35 to the 3D workstation 32 and the image server 33.

That is, since simple 3D image data, e.g., the MPR image data or the MIP image data is often effective for interpretation in the diagnosis, an engineer can generate the 3D image data with the 3D image generating unit 40, and can transfer the generated 3D image data to the image server 33 from the communication unit 41 via the network 35, depending on the examination portion or the examination type.

The 3D workstation 32 includes a communication unit 42, a 3D image storage unit 43, a 3D image generating unit 44 and a display unit 45. Further, the 3D workstation 32 has a function for generating the 3D image data from the thin-slice image data generated by the X-ray CT apparatus 31 and transferring the generated 3D image data to the image server 33. An engineer or a doctor operates the 3D workstation 32, thereby generating the 3D image data. The generated 3D image data can be output and be stored to the image server 33.

The communication unit 42 has a function for receiving and transmitting the image data via the network 35 between the X-ray CT apparatus 31 and the image server 33. That is, the communication unit 42 has a function for writing the image data received from the X-ray CT apparatus 31 to the 3D image storage unit 43 and transmitting the image data read from the 3D image storage unit 43 to the image server 33. The communication unit 42 receives the thin-slice image data from the X-ray CT apparatus 31, and the thin-slice image data is written to the 3D image storage unit 43. Further, the 3D image storage unit 43 transmits the 3D image data read by the communication unit 42 to the image server 33.

The 3D image generating unit 44 has a 3D function for reading the thin-slice-image data from the 3D image storage unit 43 and generating relatively advanced 3D image data including VR image data, SSD image data, and VE image data in addition to the normal 3D image data and a function for performing the clinical analysis including the analysis of the coronary arteries and the volume analysis of the left ventricle with the application of the 3D function. The 3D image generating unit 44 can transmit and display, on the display unit 45, information including the thin-slice image data, the 3D image data, and the result of the clinical analysis. Further, the 3D image data generated by the 3D image generating unit 44 is written to the 3D image storage unit 43.

The display unit 45 has a function for displaying information such as the thin-slice image data, the 3D image data and a result of the clinical analysis, received from the 3D image generating unit 44.

The 3D image storage unit 43 stores the thin-slice image data received from the X-ray CT apparatus 31 by the communication unit 42 and the 3D image data generated by the 3D image generating unit 44.

The image server 33 includes a communication unit 46, an image storage unit 47, a recording unit 48 and an administration unit 49. Further, the image server 33 has a function for receiving and storing the image data including the 3D image data and the slice image data generated by the X-ray CT apparatus 31 and the 3D workstation 32 and transmitting the image data to the image display apparatus 34.

The communication unit 46 has a function for receiving the image data including the 3D image data and the slice image data generated by the X-ray CT apparatus 31 and the 3D workstation 32, writing the received image data to the image storage unit 47, reading the image data from the image storage unit 47, and transmitting the read image data to the image display apparatus 34. Further, the communication unit 46 has a function for receiving and transmitting information via the network 35 between an external portion of the image server 33 and the administration unit 49.

The image storage unit 47 stores the image data, such as the 3D image data and the thick-slice image data, received by the communication unit 46. The image storage unit 47 can be composed with a hard disk.

The recording unit 48 has a function for reading the image data stored in the image storage unit 47 and recording the read image data to a recording medium 50, such as a DVD (Digital Versatile Disc) or a recording tape. Further, the recording unit 48 transmits administration information, such as a recording history of the image data, to the administration unit 49.

The administration unit 49 has a function for administering the image data stored in the image storage unit 47 and the image data recorded to the recording medium 50 from the recording unit 48. In particular, the administration unit 49 has a function for receiving a retrieving request of image data externally-transmitted via the network 35 from the communication unit 46, responding the retrieving result via the communication unit 46, and transmitting the corresponding image data to the requesting side or an device instructed by the requesting side via the communication unit 46.

The image display apparatus 34 has a function for retrieving the image data stored in the image server 33 and receiving and acquiring desired image data from the image server 33 via the network 35 and a function for displaying the acquired image data. Therefore, the image display apparatus 34 includes a communication unit 51, an acquired image storage unit 52, an input unit 53, a display unit 54, an observation area designating unit 55, a number-of-image designating unit 56, a slab image generating unit 57 and an MPR image generating unit 58.

The communication unit 51 has a function for transmitting the retrieving request of the image data received from the input unit 53 to the image server 33 via the network 35, receiving desired image data from the image server 33, and writing the received image data to the acquired image storage unit 52. The data from the image server 33 includes the thin-slice image data and MPR image data, such as the coronal image data and sagittal image data.

Therefore, the acquired image storage unit 52 stores the image data, such as the thin-slice image data and the MPR image data, acquired from the image server 33 via the network 35.

The input unit 53 includes an input device, such as a mouse and a keyboard, and has a function for inputting necessary information.

The display unit 54 has a function for displaying the image data received from the observation area designating unit 55, the number-of-image designating unit 56, the slab image generating unit 57, and the MPR image generating unit 58. Further, the display unit 54 includes a monochrome monitor desiccated for a medical image with high luminance and high resolution in many cases and, for example, can display an image with an LCD (Liquid Crystal Display) monitor that can display a portrait of 2500×2000.

The observation area designating unit 55 has a function for transmitting and displaying, on the display unit 54, image data necessary for designating a display range of the axial images displayed on the display unit 54, that is, an observation range, acquiring instructing information of the display range of the axial image from the input unit 53, and setting the display range of the axial image, and a function for transmitting the set display range of the axial image, as observation range information, to the slab image generating unit 57. Herein, the observation area designating unit 55 refers to MPR image data generated to display an MPR image for reference by the MPR image generating unit 58, which will be described later, and sets the display range of the axial image on the basis of the MPR image data and the instructing information of the display range of the axial image received from the input unit 53 in accordance with a geometrically positional relationship.

Image data necessary for designating the range of the axial images can be data for displaying, as an image, a figure and a symbol of, e.g., a scroll bar. That is, the GUI (Graphical User Interface) technology can construct the observation area designating unit 55.

The number-of-image designating unit 56 has a function for transmitting and displaying, to the display unit 54, the image data necessary for designating the number of the axial images displayed on the display unit 54, acquiring one piece of designating information of the number of axial images to be displayed and the thickness of the axial images from the input unit 53, and setting one of the number of axial images to be displayed and the thickness of the axial images, and a function for transmitting the set one of the number of axial images to be displayed and the thickness of the axial images to the slab image generating unit 57.

Similarly to the image data necessary for designating the range of the axial images, image data necessary for designating the number of axial images to be displayed or the thickness of the axial images can be data for displaying, as an image, a figure or a symbol of a scroll bar. That is, the GUI technology can construct the number-of-image designating unit 56.

The number of axial images to be displayed and the thickness of the axial images can be instructed as a value of the number of axial images and a value of the thickness of the axial images. In addition, the number of axial images to be displayed and the thickness of the axial images can be instructed with indirect information, such as the distance between the adjacent axial images.

The slab image generating unit 57 has a function for reading a plurality of pieces of the thin-slice image data included in the observation range from the acquired image storage unit 52 in accordance with the observation range information received from the observation area designating unit 55 and generating the slab image data with a required thickness so as to generate, in the observation range, the number received from the number-of-image designating unit 56 of the axial images or the axial images having the thickness received from the number-of-image designating unit 56, and a function for transmitting and displaying the generated slab image data onto the display unit 54.

The MPR image generating unit 58 has a function for reading the thin-slice image data from the acquired image storage unit 52 and generating the MPR image data, such as coronal image data and sagittal image data, by the MPR processing, and a function for displaying the MPR image by transmitting the generated MPR image data to the display unit 54. Further, the MPR image generating unit 58 transmits the MPR image data to the observation area designating unit 55 so that the MPR image data can be referred to so as to set the display range of the axial images. The observation range, serving as the display range of the axial images, can be designated by referring to the sagittal image or the coronal image displayed on the display unit 54. Further, the number of axial images to be displayed and the thickness of the axial images can be designated by referring to the sagittal image or the coronal image displayed on the display unit 54.

Next, a description is given of the motion and the operation of the image display apparatus 34.

Figure 2:
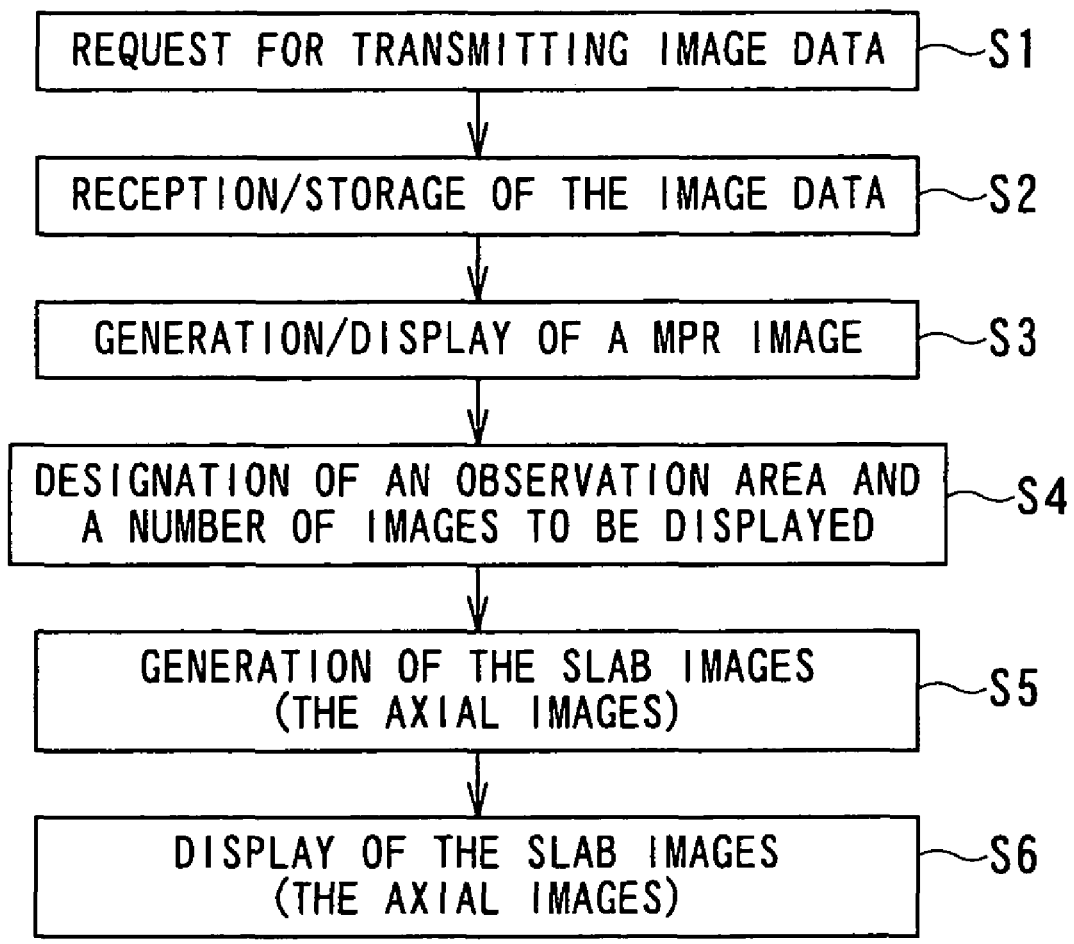
FIG. 2 is a flowchart showing the flow for designating the observation range and the number of axial images to be displayed and displaying the axial images on the image display apparatus shown in FIG. 1.

FIG. 2 is a flowchart showing the flow for designating the observation range and the number of axial images to be displayed and displaying the axial images on the image display apparatus 34 shown in FIG. 1. Reference numerals having numbers added to reference symbol S denote steps in the flowchart shown in FIG. 2.

First, image data, e.g., 3D image data is properly generated from the image data generated in advance by the X-ray CT apparatus 31, and is stored to the image server 33. That is, the scan operation using the X-ray CT apparatus 31 is performed, and the detector 36 detects X-rays which are exposed from an X-ray tube (not shown) and pass through the object. After that, the detected X-rays are stored, as raw data, to the raw data storage unit 37. The image reconstructing unit 38 reads the raw data stored in the raw data storage unit 37 and performs image reconstruction processing, thereby generating the slice image data and writing the generated image data to the reconstructed image storage unit 39. Herein, a user, e.g., an engineer generates relatively-simple 3D image data, such as an MPR image or an MIP image from the slice image data with the 3D image generating unit 40, as needed, and the generated 3D image data is written and is stored to the reconstructed image storage unit 39.

The reconstructed image storage unit 39 transmits the slice image data and the 3D image data to the image server 33 and the 3D workstation 32 via the communication unit 41 and the network 35. The communication unit 42 in the 3D workstation 32 receives the thin-slice image data generated by the X-ray CT apparatus 31, and the received thin-slice image data is written and is stored to the 3D image storage unit 43. Further, the 3D image generating unit 44 generates relatively advanced 3D image data, such as VR image data, SSD image data, or VE image data, from the thin-slice image data, and the generated 3D image data is written and is stored to the 3D image storage unit 43. Further, the display unit 45 properly displays the thin-slice image data and the 3D image data.

The above-generated 3D image data is transmitted to the image server 33 via the communication unit 42 and the network 35. The communication unit 46 of the image server 33 receives the slice image data and the 3D image data transmitted from the X-ray CT apparatus 31 and the 3D image data transmitted from the 3D workstation 32. The received slice image data and 3D image data is written and is stored to the image storage unit 47. Further, the recording unit 48 reads the image data stored in the image storage unit 47, as needed, and is recorded to the recording medium 50. In this case, the administration information, such as a recording history of the image data, is transmitted to the administration unit 49. The administration unit 49 administers the image data stored in the image storage unit 47 and the image data recorded to the recording medium 50 from the recording unit 48.

In step S1, the operation of the input unit 53 of the image display apparatus 34 transmits, to the communication unit 51, a retrieving request and a transmitting request of desired image data, such as the thin-slice image data or the MPR image data, and the retrieving request and the transmitting request are transmitted to the administration unit 49 in the image server 33 via the network 35. Therefore, the administration unit 49 retrieves the image data in the image storage unit 47, and reads the requested image data.

Subsequently, in step S2, the administration unit 49 in the image server 33 transmits the image data read from the image storage unit 47 via the communication unit 46 and the network 35 to the image display apparatus 34. Therefore, the communication unit 51 in the image display apparatus 34 receives the image data transmitted from the image server 33, and the received image data is stored to the acquired image storage unit 52.

In step S3, the MPR image generating unit 58 reads the thin-slice image data from the acquired image storage unit 52, generates the MPR image data, such as the coronal image data or the sagittal image data by performing MPR processing, and transmits the generated MPR image data to the display unit 54, thereby displaying the MPR image on the display unit 54.

Figure 3:
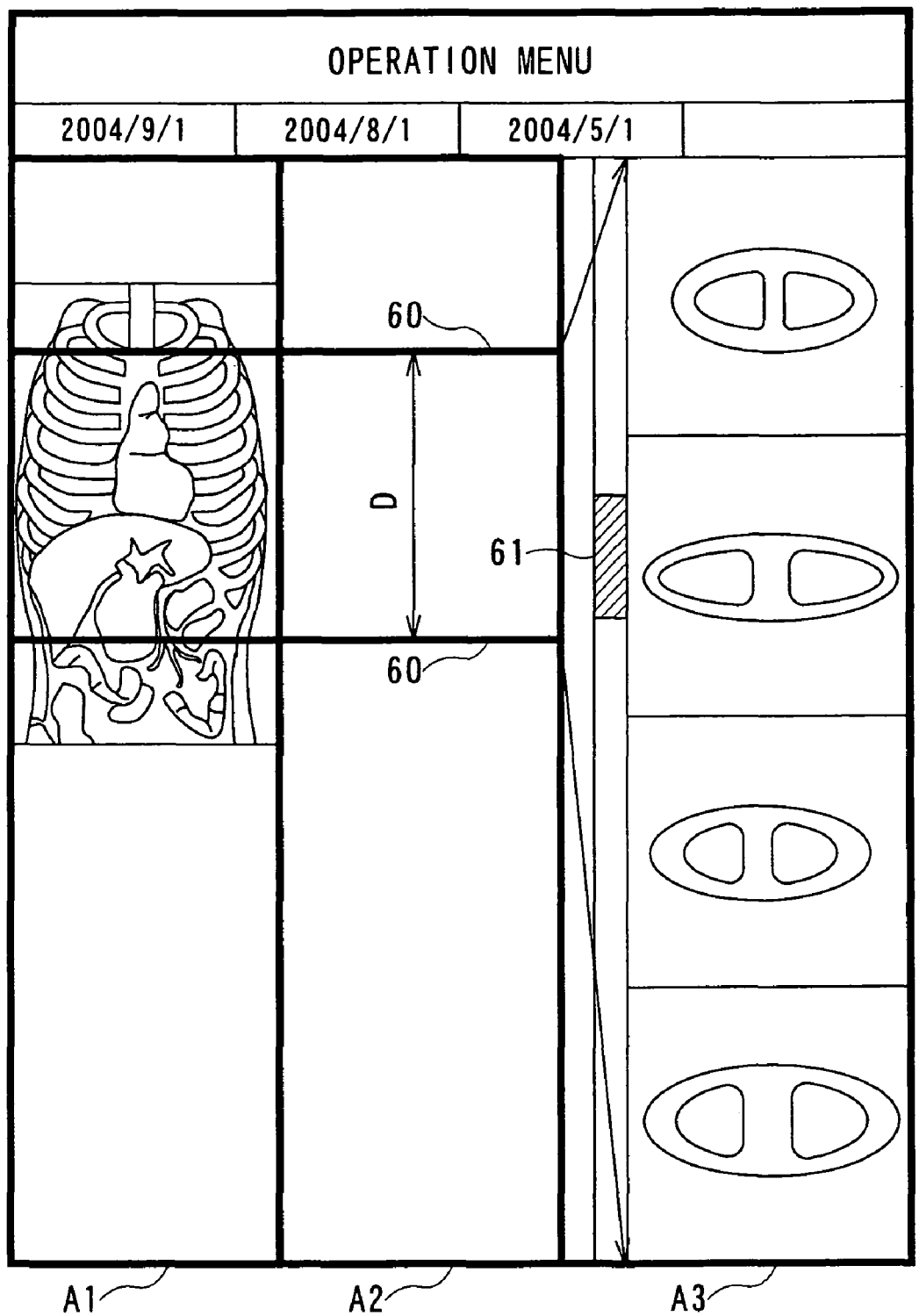
FIG. 3 is a diagram showing an example of screen displayed on the display unit of the image display apparatus shown in FIG. 1.

FIG. 3 is a diagram showing an example of screen displayed on the display unit 54 of the image display apparatus 34 shown in FIG. 1.

For example, the display unit 54 displays an image shown in FIG. 3 in a window format. That is, in a screen example of the display unit 54 shown in FIG. 3, a display area A1 of the coronal image is arranged to the left, a display area A2 of the sagittal image is arranged to the center, and a display area A3 of the axial image is arranged to the right. The coronal image and the sagittal image generated by the MPR image generating unit 58 are displayed in the display area A1 of the coronal image and the display area A2 of the sagittal image, respectively. Note that the sagittal image is omitted in FIG. 3.

The display unit 54 may display a scout image obtained by the X-ray CT apparatus 31 for making an imaging plan instead of the image generated by the MPR image generating unit 58 on the display area A1. Relationships between coordinate positions of a scout image and those of slice images can be specified by using information on a distance per a pixel and a coordinate of the table at a reference position (e.g., upper left of an image) incidental to an image.

Note that, upon obtaining an image of a wide area including about 2,000 pieces of the thin-slice image data, the coronal image and the sagittal image become a long image in the vertical direction from the cervix to the lower limbs. In this case, the display area A1 of the coronal image and the display area A2 of the sagittal image are set to be long in the vertical direction while assuming such a case, thereby improving the convenience.

The observation area designating unit 55 displays, on the display unit 54, e.g., bars 60 for designating an observation range D. Therefore, the observation range can be designated by moving the bars 60 with the operation of the input unit 53, such as a mouse. Further, it is possible to designate the number of axial images to be displayed and the thickness of the axial images. Herein, a description is given of the case of designating the number of axial images to be displayed.

In step S4, the operation of the input unit 53 designates the observation range and the number of axial images to be displayed. That is, a scroll function of the input unit 53, such as a mouse, moves the two bars 60 displayed on the coronal image or the sagittal image, and the observation area designating unit 55 designates the observation range.

Further, the operation of the input unit 53 instructs the number of the axial images, which are to be displayed, within the designated observation range. The number of the axial images can be instructed by inputting the distance between adjacent axial images or the slice thickness of the axial images from the input unit 53 as well as by inputting the number of the axial images, as a value, from the input unit 53. Further, after the observation range is designated once, the number of axial images to be displayed can be also designated by a scroll function of the input unit 53 using a mouse. In this case, the convenience can be improved by displaying a line segment for slicing the observation range within the designated observation range.

The number-of-image designating unit 56 acquires information inputted from the input unit 53, thereby setting the number of axial images to be displayed on the display unit 54. Then, the observation area designating unit 55 transmits the observation range information to the slab image generating unit 57, and the number-of-image designating unit 56 transmits information on the number of axial images to be displayed to the slab image generating unit 57.

Subsequently, in step S5, the slab image generating unit 57 reads the thin-slice image data included within the observation range from the acquired image storage unit 52 and generates the slab image with a desired thickness so as to generate, within the observation range received from the observation area designating unit 55, the number of the axial images, received from the number-of-image designating unit 56.

Figure 4:
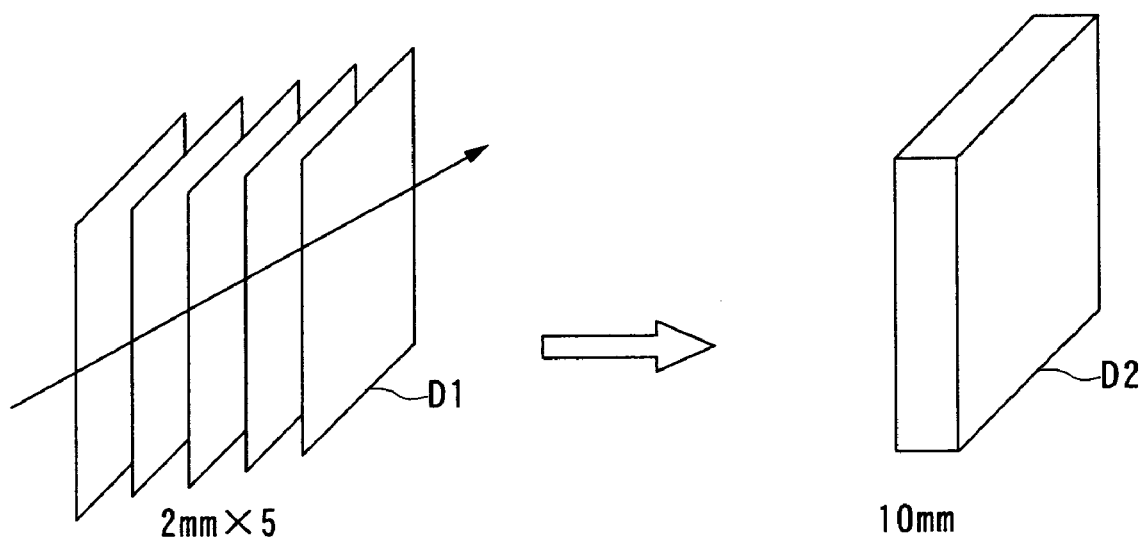
FIG. 4 is a diagram explaining an example of method for generating slab image data by the slab image generating unit of the image display apparatus shown in FIG. 1.

FIG. 4 is a diagram explaining an example of method for generating slab image data by the slab image generating unit 57 of the image display apparatus 34 shown in FIG. 1.

Referring to FIG. 4, when the slice thickness of thin-slice image data D1 is 2 mm and the slice thickness of desired slab image data D2, as a target, is 10 mm, five pieces of the thin-slice image data D1 are overlaid and the data is added into average every pixel of the thin-slice image data D1, thereby obtaining the slab image data D2.

In step S6, the slab image generating unit 57 transmits the generated slab image data to the display unit 54, thereby displaying the slab image data on the display unit 54. Therefore, referring to FIG. 3, a display area of the axial image on the display unit 54 displays the slab image generated by the slab image generating unit 57 in the tile format. Further, the slab images can be also displayed in the stack format.

As a consequence thereof, a user, e.g., a doctor can observe the slab images displayed, as the axial images, on the display unit 54 and can interpret the image. In this case, generally, the number of the axial images is relatively large in view of the screen size. Therefore, a scroll bar 61 is arranged, and the axial image can be displayed by moving the scroll bar 61 with a desired size thereof.

That is, the above-mentioned image display apparatus 34 generates and displays the slab images within a desired observation range with a desired slice thickness from the slice image data acquired from the image server 33 while displaying the sagittal image and the coronal image, as reference images.

In general, a display condition for displaying a plurality of the axial images includes the observation range, the slice thickness of the axial images, and the number of axial images to be displayed. These display conditions have a trade-off relationship therebetween. When the priority of one display condition rises, the priorities of other display conditions fall. Therefore, a display approach of a plurality of the axial images includes three approaches of: an approach of giving the priority to the observation range; an approach of giving the priority to the number of axial images to be displayed; and an approach of giving the priority to the slice thickness of the axial images. The priority is set to the image display apparatus 34, in order of the observation range, the number of axial images to be displayed, and the slice thickness of the axial images.

The image display apparatus 34 can always generate a desired number of axial images within an observation range for interpretation. Thus, the operations of the image display apparatus 34 prior to the interpretations of the 2D images are always similar each other. The setting operation of a small observation range facilitates further specifical interpretation of the 2D image.

Further, the image display apparatus 34 can generate desired axial image data from a smaller amount of the slice image data. Therefore, the image server 33 may store only a smaller amount of the slice image data. Thus, although the conventional art has a problem that the storage of the thin-slice image data in the image server 33 causes excessive increase in data size, with the image display apparatus 34, a certain amount of the thin-slice image data can be stored in the image server 33.

That is, with the image display apparatus 34, it is possible to properly use the communication resource and the storage resource. Further, it is possible to realize the simple operation and the efficient display operation of the axial images by referring to the coronal image and the sagittal image of the whole body.

In the above-mentioned example, the MPR image is used as a reference image. However, is possible to generate and acquire an arbitrary image which can be used for the setting operation of the display range of the axial images, as the reference image, as well as the MPR image. A scanogram is an example of an image that can be used as the reference image. In this case, the image display apparatus 34 may have a reference image display unit having a function for generating or acquiring the reference image, and the reference image display unit may display the reference image on the display unit 54. Further, in order to set the display range of the axial images, the reference image display unit can transmit positional information regarding as the reference image to the observation area designating unit 55.

Figure 5:
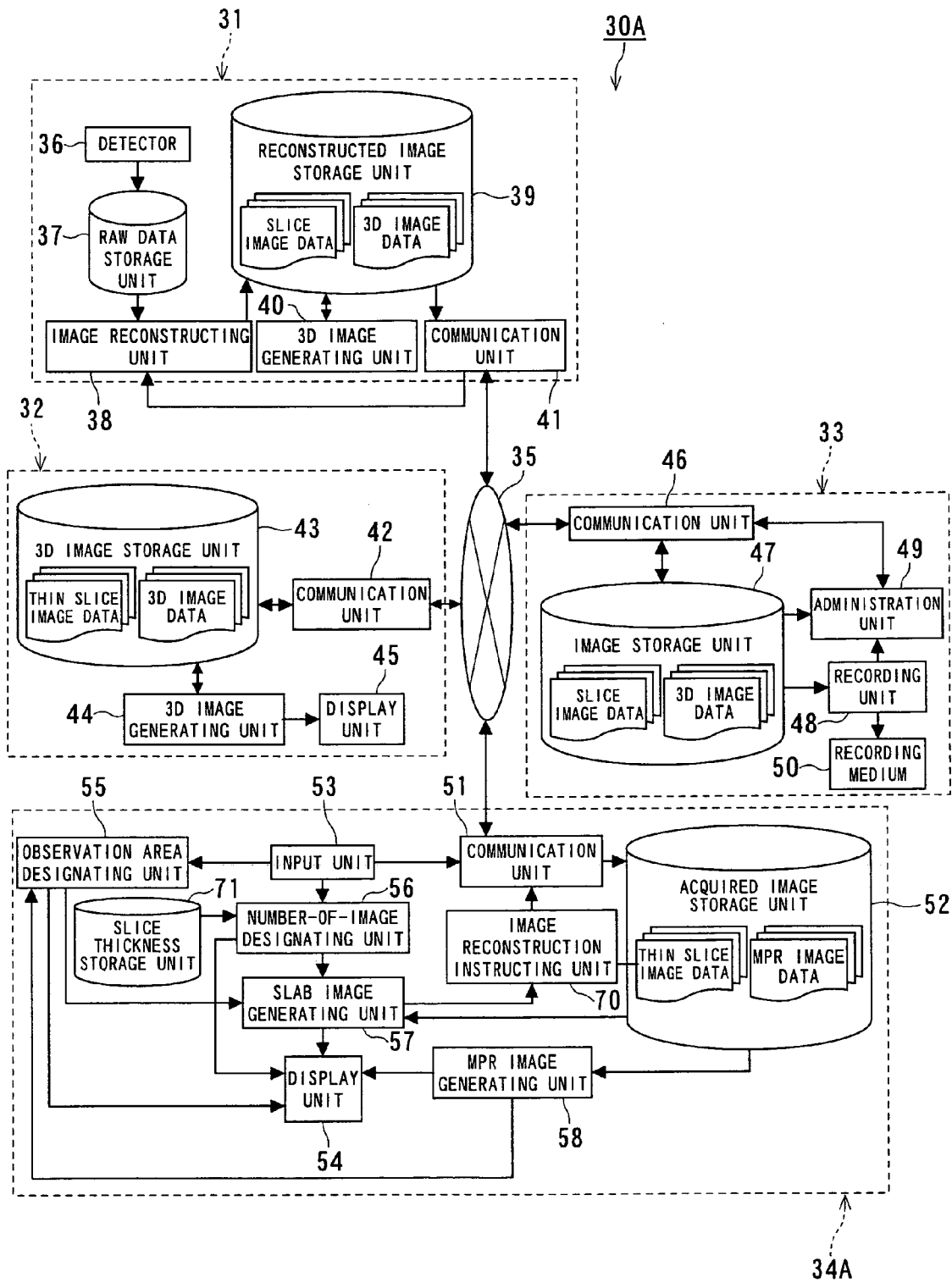
FIG. 5 is a block diagram showing an X-ray CT image diagnostic display system including an image display apparatus according to a second embodiment of the present invention.

FIG. 5 is a block diagram showing an X-ray CT image diagnostic display system including an image display apparatus according to a second embodiment of the present invention.

In an X-ray CT image diagnostic display system 30A shown in FIG. 5, terms that an image display apparatus 34A includes a image reconstruction instructing unit 70 and a slice thickness storage unit 71, terms that some functions are added to elements of the image display apparatus 34A and detail function of the X-ray CT apparatus 31 are different from the X-ray CT image diagnostic display system 30 shown in FIG. 1. Other constructions and operations of the X-ray CT image diagnostic display system 30A are not different from those of the X-ray CT image diagnostic display system 30 shown in FIG. 1 substantially. Therefore, attaching same number to a same element as that of the X-ray CT image diagnostic display system 30 and omitting explanation thereof.

An image display apparatus 34A in an X-ray CT-image diagnostic display system 30A includes an image reconstruction instructing unit 70 and a slice thickness storage unit 71, in addition to the components in the image display apparatus 34 shown in FIG. 1.

The slab image generating unit 57 in the image display apparatus 34A has a function for determining whether or not the thin-slice image data that is sufficient to generate the slab image is stored in the acquired image storage unit 52, prior to the generation of the slab image, in addition to the same function as that of the slab image generating unit 57 in the image display apparatus 34 shown in FIG. 1. When it is determined that sufficient thin-slice image data is stored in the acquired image storage unit 52, the slab image generating unit 57 generates the slab image from the thin-slice image data. On the other hand, when it is determined that sufficient thin-slice image data is not stored in the acquired image storage unit 52, such a fact is transmitted to the image reconstruction instructing unit 70 by the slab image generating unit 57.

Note that, example cases in which the acquired image storage unit 52 does not store the thin-slice image data that is sufficient to generate the slab image includes, a case that the acquired image storage unit 52 does not store the thin-slice image data with the slice thickness thereof thinner than that of the slab image to be generated (in particular, the acquired image storage unit 52 does not store the thin-slice image data with the slice thickness thinner than ½ of that of slab image to be generated), a case that the acquired image storage unit 52 does not store the thin-slice image data within the entire observation range or a part of the observation range, and a case that the slab image data cannot be generated from the thin-slice image data stored in the acquired image storage unit 52 upon generating the slab image data with a designated scaling rate or designating an oblique cross-section and generating the slab image data. Herein, the scaling rate can be designated by designating the lateral widths of the coronal image or the sagittal image displayed on the display unit 54.

Upon receiving a notification indicating that the acquired image storage unit 52 does not store the sufficient thin-slice image data from the slab image generating unit 57, the image reconstruction instructing unit 70 has a function for generating a reconstructing instruction (command) of necessary slice-image-data and transmitting the generated reconstructing command of the slice image data, via the communication unit 51 and the network 35, to the X-ray CT apparatus 31 or another image reconstructing device. Further, the image reconstruction instructing unit 70 can transmit the transmitting destination of the slice image data to be reconstructed in addition to the reconstructing instruction, via the communication unit 51 and the network 35, to the X-ray CT apparatus 31 or another image reconstructing device in accordance with the reconstructing instruction of the necessary slice-image-data. Therefore, when the transmitting destination of the slice image data is the image display apparatus 34A, the image display apparatus 34A can acquire the slice image data reconstructed by the X-ray CT apparatus 31 or another image reconstructing device.

Corresponding to the function of the image reconstruction instructing unit 70, the X-ray CT apparatus 31 can transmit, to the image reconstructing unit 38, the reconstructing instruction of the slice image data received from the image reconstruction instructing unit 70 in the image display apparatus 34A by the communication unit 41 via the network 35. Further, the communication unit 41 in the X-ray CT apparatus 31 transmits the slice image data reconstructed by the image reconstructing unit 38 in accordance with the reconstructing instruction to the transmitting destination of the slice image data received from the image reconstruction instructing unit 70 via the communication unit 51 and the network 35. The communication unit 51 in the image display apparatus 34A can receive the slice image data transmitted from the communication unit 41 in the X-ray CT apparatus 31 via an arbitrary component connected to the network 35.

The slice thickness storage unit 71 stores, in advance, observation parts of objects, serving as observation targets, and slice thicknesses of the slab image data to be designated upon generating the axial image data with respective correlations therebetween. Note that other observation image conditions including FOV, in addition to the slice thicknesses may be correlated with the observation parts and may be stored.

Upon receiving an instruction of the observation part from the input unit 53, the number-of-image designating unit 56 refers to the slice thickness storage unit 71 and sets the slice thickness correlated with the observation part, as the slice thickness of the axial image data. Subsequently, the set slice thickness and another observation image condition are transmitted to the slab image generating unit 57.

Next, a description is given of the motion and the operation of the image display apparatus 34A.

Figures 6, 7:
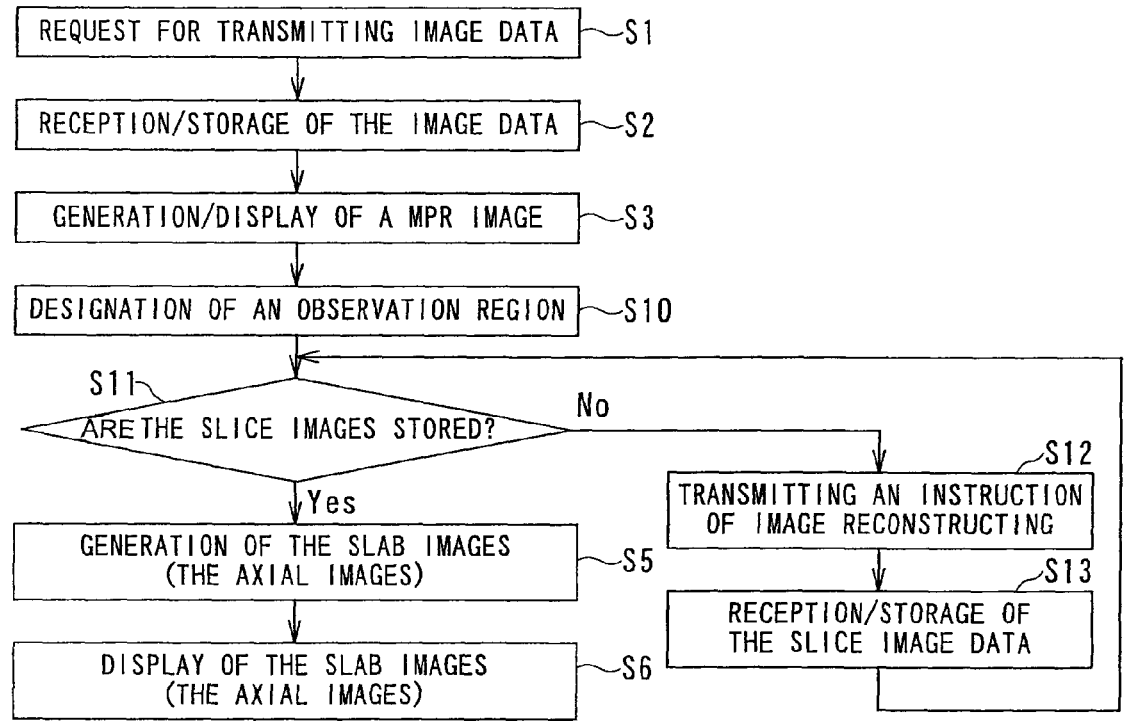
FIG. 6 is a flowchart showing the flow for designating the observation part and displaying the axial images on the image display apparatus shown in FIG. 5.
FIG. 7 is a diagram showing an example of data stored in the slice thickness storage unit of the image display apparatus shown in FIG. 5.

FIG. 6 is a flowchart showing the flow for designating the observation part and displaying the axial images on the image display apparatus 34A shown in FIG. 5. Reference numerals having numbers added to reference symbol S denote steps in the flowchart shown in FIG. 6.

Note that the same steps in the flow as that shown in FIG. 2 are designated by the same reference numerals, and descriptions thereof are omitted.

In steps S1 to S3, the display unit 54 displays the coronal image or the sagittal image. Subsequently, in step S10, by designating only the observation part, as a display condition of the axial image data from the input unit 53, the number-of-image designating unit 56 refers to the slice thickness storage unit 71 and can automatically set the slice thickness of the slab image data to be generated.

FIG. 7 is a diagram showing an example of data stored in the slice thickness storage unit 71 of the image display apparatus 34A shown in FIG. 5.

Referring to FIG. 7, the slice thickness storage unit 71 stores the observation parts and the slice thicknesses with respective correlation relationships therebetween. When the observation part instructed from the input unit 53 is the chest portion, the slice thickness of 10 mm is set. Therefore, the slice thickness of 10 mm is automatically transmitted to the slab image generating unit 57.

In step S11, the slab image generating unit 57 determines whether or not the acquired image storage unit 52 stores the thin-slice image data with the slice thickness thinner than the slice thickness received from the number-of-image designating unit 56.

When it is determined that the acquired image storage unit 52 does not store the thin-slice image data, in step S12, the slab image generating unit 57 transmits an instruction indicating such a fact to the image reconstruction instructing unit

70. The image reconstruction instructing unit 70 generates a reconstructing instruction (command) of the slice image data thinner than a necessary slice-thickness, that is, the slice thickness set by the number-of-image designating unit 56. Further, the image reconstruction instructing unit 70 transmits, to the X-ray CT apparatus 31 via the communication unit 51 and the network 35, the generated reconstructing instruction of the slice image data and the transmitting destination of the reconstructed slice image data.

The communication unit 41 in the X-ray CT apparatus 31 receives the reconstructing instruction of the slice image data from the image display apparatus 34, and transmits the received reconstructing instruction of the slice image data to the image reconstructing unit 38. The image reconstructing unit 38 reads the raw data of corresponding patient and examination from the raw data storage unit 37 in accordance with the reconstructing instruction of the slice image data, and reconstructs the slice image data with a thinner slice thickness matching the condition for reconstructing instruction. The reconstructed slice image data is written and is stored to the reconstructed image storage unit 39, as needed. After that, the communication unit 41 transmits the reconstructed slice image data directly to the image display apparatus 34 via the network 35, or to the image display apparatus 34 via the image server 33 in accordance with the information on the transmitting destination of the slice image data.

Therefore, in step S13, the communication unit 51 in the image display apparatus 34 receives the slice image data, and the received slice image data is written and is stored to the acquired image storage unit 52.

When the slab image generating unit 57 determines in step S11 that the thin-slice image data is stored in the acquired image storage unit 52, in steps S5 and S6, the slab image data is generated by the slab image generating unit 57. The generated slab image data is transmitted to and is displayed on the display unit 54.

That is, with the above-mentioned image display apparatus 34A, it is determined whether or not the slice thickness of the thin-slice image data received from the image server 33 is thinner than the requested slice thickness necessary for generating the slab image data. Upon determining that the slice thickness of the thin-slice image data is thicker than the requested slice thickness, it is instructed to the image reconstructing unit 38 in the X-ray CT apparatus 31 to reconstruct the slice image data with a desired slice thickness.

Therefore, with the image display apparatus 34A, when it is determined that the thin-slice image data with a desired slice thickness was not reconstructed upon acquiring an image, the thin-slice image data can be reconstructed at the determining timing, from the raw data. Thus, required slice image data with high resolution may be generated to a necessary portion. As a consequence thereof, the resource of the image server 33 can be effectively used.

Further, the image display apparatus 34A correlates the slice thicknesses of the axial image data with the observation parts respectively and stores the correlated slice thicknesses of the axial image data. Upon designating the observation part, the image display apparatus 34A can automatically generate and can display the axial image data of the slice thickness correlated with the observation part, without additionally designating the slice thickness.

Therefore, a user can display and can observe the axial image without individually designating the number of slices of the axial image data and the slice thickness of the axial images. Further, the user may manually designate a desired slice thickness, as needed. As a consequence thereof, the convenience of the user can be improved.

Figure 8:
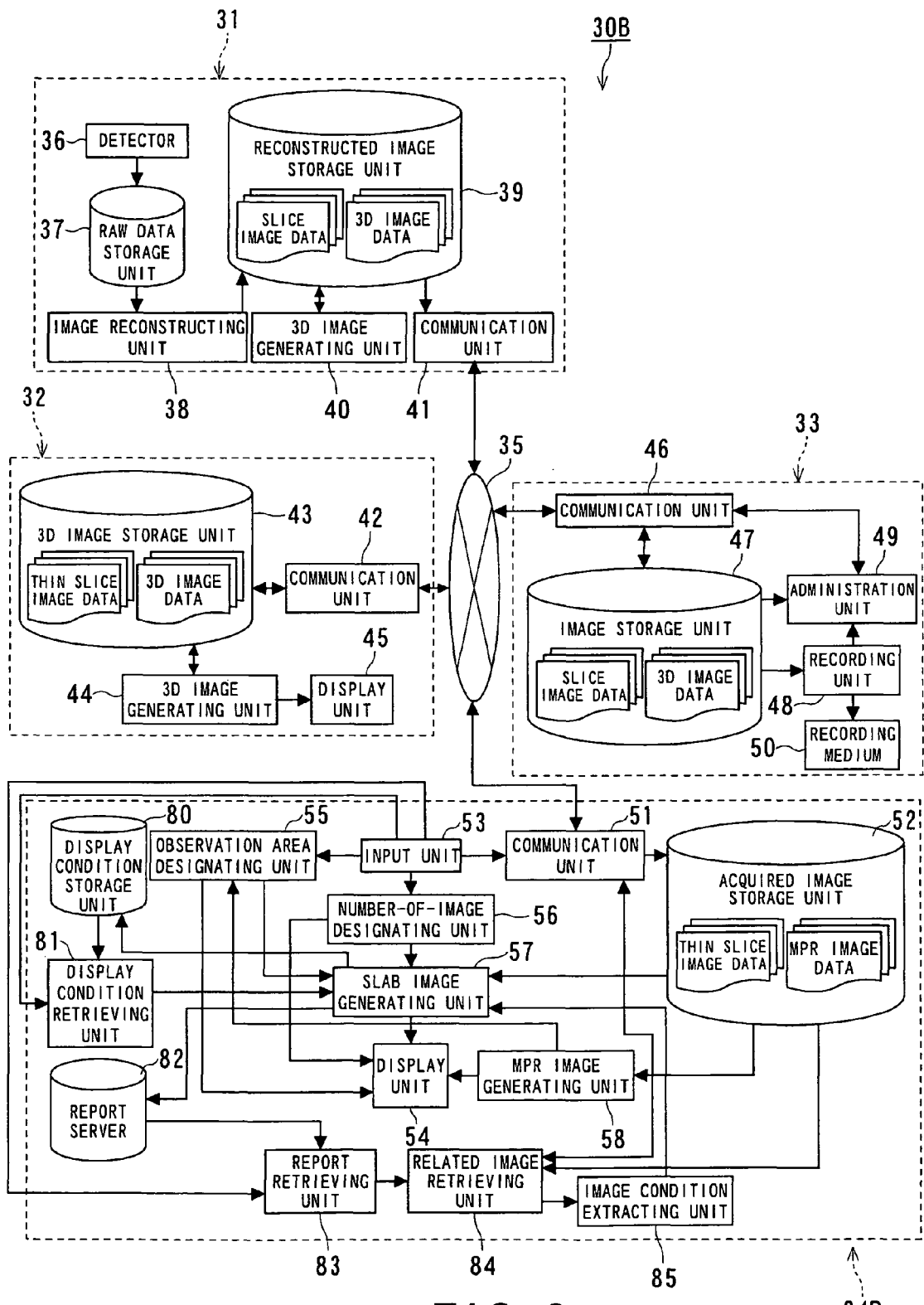
FIG. 8 is a block diagram showing an X-ray CT image diagnostic display system including an image display apparatus according to a third embodiment of the present invention.

FIG. 8 is a block diagram showing an X-ray CT image diagnostic display system including an image display apparatus according to a third embodiment of the present invention.

In an X-ray CT image diagnostic display system 30B shown in FIG. 8, terms that an image display apparatus 34B includes a display condition storage unit 80, a display condition retrieving unit 81, a report server 82, a report retrieving unit 83, a related image retrieving unit 84 and an image condition extracting unit 85 and detail functions of the elements of the image display apparatus 34B are different from the X-ray CT image diagnostic display system 30 shown in FIG. 1. Other constructions and operations of the X-ray CT image diagnostic display system 30B are not different from those of the X-ray CT image diagnostic display system 30 shown in FIG. 1 substantially. Therefore, attaching same number to a same element as that of the X-ray CT image diagnostic display system 30 and omitting explanation thereof.

An image display apparatus 34B of an X-ray CT-image diagnostic display system 30B includes a display condition storage unit 80, a display condition retrieving unit 81, a report server 82, a report retrieving unit 83, a related image retrieving unit 84 and an image condition extracting unit 85, in addition to the components of the image display apparatus 34 shown in FIG. 1.

The slab image generating unit 57 has: a function for correlating image conditions including the position of the slab image data, the number of slab image data, the slice thickness of slab image data, and FOV with observation ranges and writing the correlated image conditions, as display condition information, to the display condition storage unit 80, upon generating the slab image data; and a function for correlating identification information the slab image that is the related image with the interpretation report information including document content and identification information of the interpretation report and writing the correlated interpretation report information to the report server 82, upon generating an interpretation report with the slab image used for observation that is used as the related image, in addition to the same functions as those of the slab image generating unit 57 shown in FIG. 1.

Therefore, the report server 82 stores IDs (identification information) of the related images correlated with the interpretation report information. Note that the identification information of the related image includes an identifier such as SOP (service object pair) Instance UID. Further, information, such as 2D image data, examination image data (2D), and examination date of a patient can be correlated with the interpretation report information, as needed.

The display condition storage unit 80 stores the display condition information acquired from the slab image generating unit 57. Further, the display condition information can additionally include information such as 2D image data, examination image data (2D), and examination date of a patient, as needed.

The display condition retrieving unit 81 has a function for reading the past display condition information, e.g., the last display condition information from the display condition storage unit 80 by retrieving the display condition information in the display condition storage unit 80, and for transmitting the display condition information to the slab image generating unit 57, upon receiving an instruction of retrieving the past display condition from the input unit 53. In this case, e.g., upon instructing the observation part from the input unit 53, the past display condition information of the same observation part can be extracted. Alternatively, the observation range and the slice thickness on the last generation of the axial image can be extracted, as the display condition information.

Upon receiving the display condition information from the display condition retrieving unit 81, the slab image generating unit 57 generates the slab image data under the same display condition as the past one in accordance with the display condition information received from the display condition retrieving unit 81.

Note that, in place of arranging the display condition storage unit 80 to the image display apparatus 34 or in addition to arrange the display condition storage unit 80 to the image display apparatus 34, the display condition storage unit 80 may be arranged to the image server 33 so as to receive and transmit the display condition information via the network 35 between the image display apparatus 34 and the image server 33.

The report retrieving unit 83 has: a function for retrieving the report server 82 and extracting the interpretation report information, upon receiving an instruction of retrieving the past interpretation report, e.g., the interpretation report generated in the last interpretation from the input unit 53; and a function for transmitting the extracted the interpretation report information to the related image retrieving unit 84.

The related image retrieving unit 84 has a function for acquiring the related image data by retrieving one of the acquired image storage unit 52 and the image server 33 or both of them with identification information, such as an image identifier of the related image, upon correlating the identification information of the related image with the interpretation report information received from the report retrieving unit 83; and a function for transmitting the acquired related image data to the image condition extracting unit 85.

The image condition extracting unit 85 has: a function for extracting image conditions, such as the position, the slice thickness and FOV, incidental to the related image data received from the related image retrieving unit 84, and a function for transmitting the extracted image conditions to the slab image generating unit 57.

The slab image generating unit 57 generates the axial image data with the same slice thickness within the same observation range from the thin-slice image data in accordance with the image conditions received from the image condition extracting unit 85, and transmits the generated axial image data to the display unit 54, thereby displaying the axial image.

Next, a description is given of the motion and the operation of the image display apparatus 34B.

Figure 9:
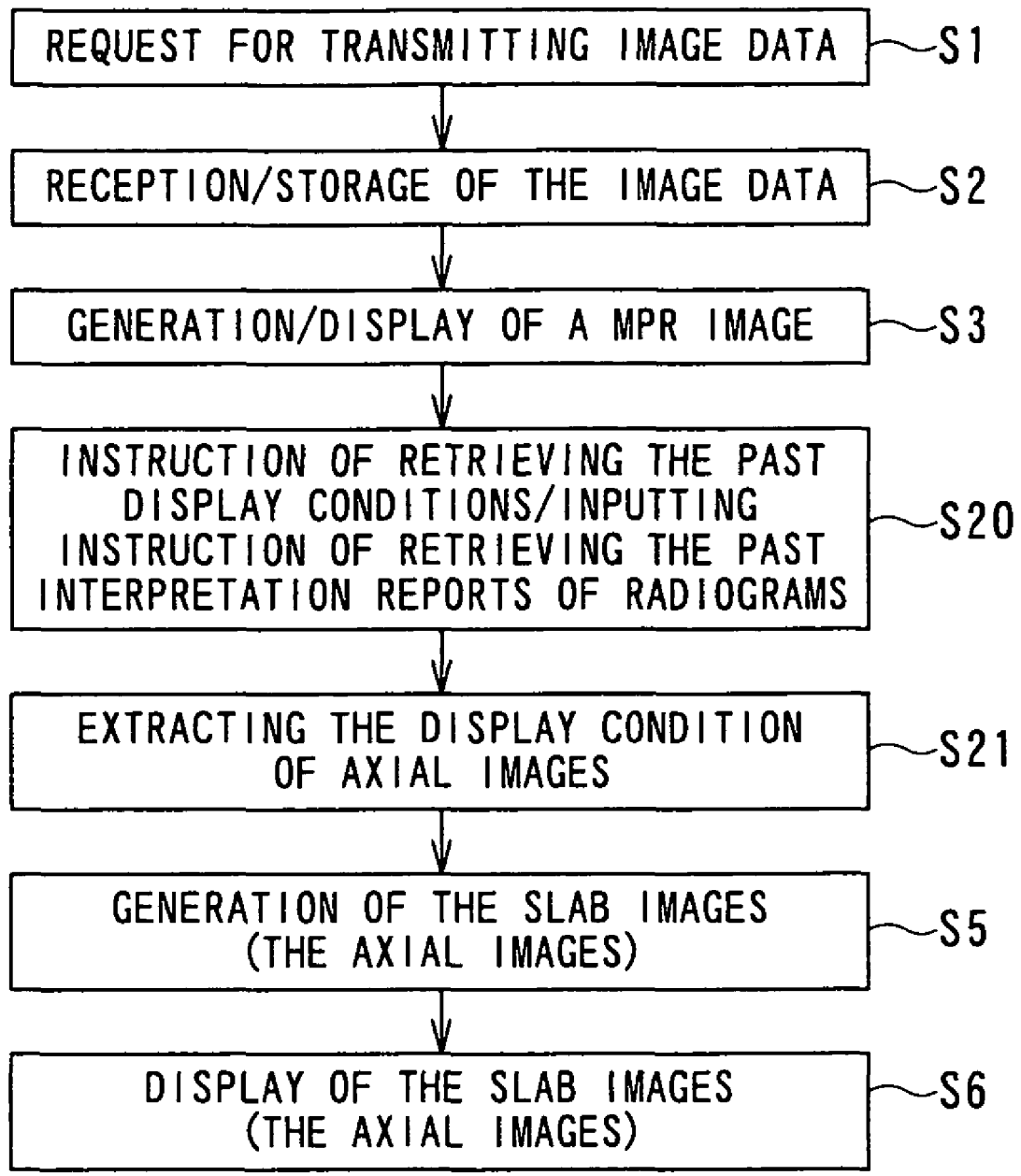
FIG. 9 is a flowchart showing the flow for automatically setting the display condition and displaying the axial images on the image display apparatus shown in FIG. 8.

FIG. 9 is a flowchart showing the flow for automatically setting the display condition and displaying the axial images on the image display apparatus 34B shown in FIG. 8. Reference numerals having numbers added to reference symbol S denote steps in the flowchart shown in FIG. 9.

Note that the same steps in the flow as those shown in FIG. 2 are designated by the same reference numerals, and descriptions thereof are omitted.

In steps S1 to S3, the display unit 54 displays the coronal image or the sagittal image. In step S20, it is possible to automatically set the slice thickness of the slab image data to be generated by designating only an instruction of retrieving the past display condition or an instruction of retrieving the past interpretation report from the input unit 53, as a display condition of the axial image data. Upon inputting the instruction of retrieving the past display condition from the input unit 53, the inputted instruction of retrieving the past display condition is transmitted to the display condition retrieving unit 81. Upon inputting the instruction of retrieving the past interpretation report from the input unit 53, the inputted instruction of retrieving the past interpretation report is transmitted to the report retrieving unit 83.

Subsequently, in step S21, the display condition of the axial images is automatically set by the display condition retrieving unit 81 or the image condition extracting unit 85. That is, when the display condition retrieving unit 81 receives the instruction of retrieving the past display condition, the display condition retrieving unit 81 reads, e.g., the last display condition information from the display condition storage unit 80, and transmits the read last display condition information to the slab image generating unit 57.

On the other hand, when the report retrieving unit 83 receives the instruction of retrieving the past interpretation report, the report retrieving unit 83 extracts the interpretation report information from the report server 82 and transmits the extracted interpretation report information to the related image retrieving unit 84. The related image retrieving unit 84 acquires the related image data by retrieving one of the acquired image storage unit 52 and the image server 33 or both of them with the identification information, such as the image identifier of the related image correlated with the interpretation report information, and transmits the acquired related image data to the image condition extracting unit 85. Further, the image condition extracting unit 85 extracts the image conditions including the position, the slice thickness, and FOV, incidental to the related image data received from the related image retrieving unit 84, and transmits the extracted image conditions to the slab image generating unit 57.

As mentioned above, the slab image generating unit 57 receives the display condition, such as the observation range and the slice thickness, or the image condition. In steps S5 and S6, the slab image generating unit 57 generates the slab image data. The generated slab image data is transmitted to the display unit 54 and is displayed on the display unit 54.

That is, upon generating new slab-image-data within the observation range equivalent to the observation range of the slab image displayed in the past, the above-mentioned image display apparatus 34B can generate the new slab image data under the same display condition as the past one of the slab image data without designating the display condition.

Therefore, upon additionally generating and displaying another slab-image with the same slice thickness as that of the past slab image for the purpose of the interpretation with comparison with the slab (axial) image acquired in the past examination, the slab image data can be easily generated with the same slice thickness. As a consequence thereof, the past slab image can be immediately compared with the additionally-generated slab image, and both of them can be displayed, thereby reducing the interpretation time. Further, in the comparison and interpretation, the current conditions, such as the observation range, the slice thickness, and the scaling rate (FOV) are effectively set to be the same as the past conditions. Further, the same 3D processing including MPR processing, MIP processing, and SSD processing is performed both in the current case and the past case, thereby easily performing the interpretation with comparison.

When the image display apparatus 34B refers to the past interpretation report and finds the related image, the display condition of the slab image can be reproduced from the related image. Therefore, the slab image can be generated within the same observation range with the same slice thickness as those of the related image which is a key correlated with, e.g., the last interpretation report from another slice image data, and the generated slab image can be displayed on the display unit 54.

Figure 10:
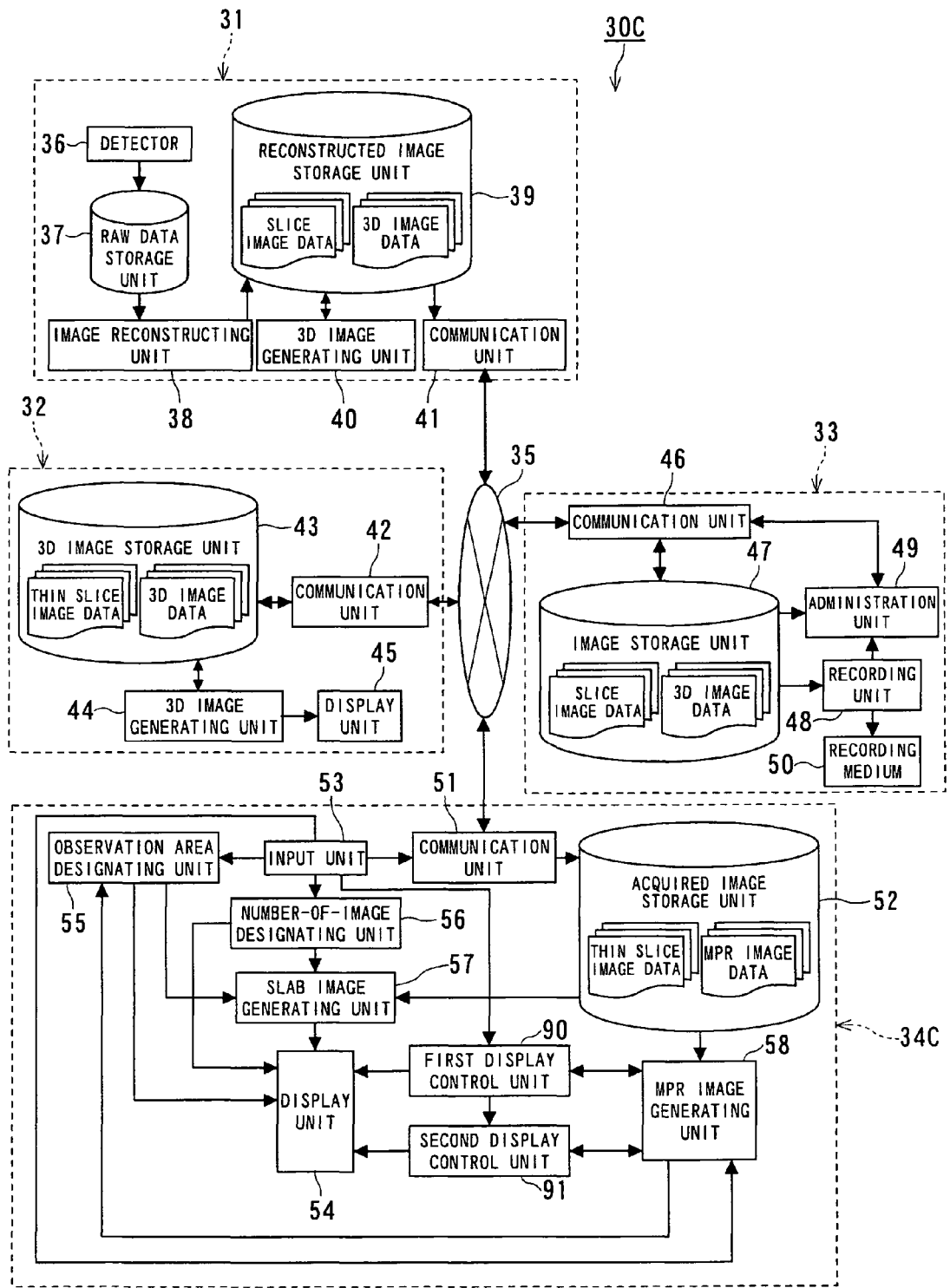
FIG. 10 is a block diagram showing an X-ray CT image diagnostic display system including an image display apparatus according to a fourth embodiment of the present invention.

FIG. 10 is a block diagram showing an X-ray CT image diagnostic display system including an image display apparatus according to a fourth embodiment of the present invention.

In an X-ray CT image diagnostic display system 30C shown in FIG. 10, terms that an image display apparatus 34C includes a first display control unit 90 and a second display control unit 91 and detail functions of the elements of the image display apparatus 34C are different from the X-ray CT image diagnostic display system 30 shown in FIG. 1. Other constructions and operations of the X-ray CT image diagnostic display system 30C are not different from those of the X-ray CT image diagnostic display system 30 shown in FIG. 1 substantially. Therefore, attaching same number to a same element as that of the X-ray CT image diagnostic display system 30 and omitting explanation thereof.

An image display apparatus 34C in an X-ray CT-image diagnostic display system 30C includes a first display control unit 90 and a second display control unit 91, in addition to the components in the image display apparatus 34 shown in FIG. 1.

The MPR image generating unit 58 includes a function for generating the MPR image data in accordance with an instruction of changing the scaling rate received from the input unit 53, upon receiving the instruction of changing the scaling rate including an enlarging instruction and a reducing instruction of the MPR image displayed on the display unit 54 from the input unit 53; and a function for generating the MPR image data in a desired direction with a desired scaling rate in accordance with the instruction of generating the MPR image data received from the first display control unit 90 and the second display control unit 91, in addition to the same functions as those of the MPR image generating unit 58 shown in FIG. 1. The MPR image data generated by the MPR image generating unit 58 is transmitted to the first display control unit 90 and the second display control unit 91.

The first display control unit 90 has a function for displaying the MPR image on the display unit 54 by transmitting the MPR image data received from the MPR image generating unit 58 to the display unit 54; and a function for determining whether or not the horizontal width in the axial cross-sectional direction of the MPR image is wider than the horizontal width of a display pane for displaying the MPR image on the display unit 54, upon receiving an instruction of displaying a tomographic observation screen for displaying the MPR image in an arbitrary direction, e.g., three directions from the input unit 53. Further, the first display control unit 90 has a function for transmitting the determining result to the second display control unit 91, generating image information for overlaying a figure or a symbol such as a line segment indicating the position of the display pane of a longitudinal direction (in the upper-limit width direction) of the tomographic observation screen to one of the coronal image and the sagittal image or both of them displayed on the display unit 54 and for displaying the overlaid figure or the symbol, and transmitting the generated image information to the display unit 54.

Further, the first display control unit 90 has a function for transmitting an instruction of generating the MPR image data, of which the center is on the changed position in the area, in an arbitrary direction to the MPR image generating unit 58, upon receiving the instruction of changing the center position of the MPR image displayed on the tomographic observation screen with the operation of the input unit 53 while the display unit 54 displays the tomographic observation screen. The first display control unit 90 can generate image information for overlaying a scrollable figure to the coronal image or the sagittal image and for displaying the scrollable figure, so as to easily change the instruction of changing the center position of the MPR image displayed on the tomographic observation screen with the input unit 53, such as a mouse and can transmit the generated image information to the display unit 54.

The second display control unit 91 has: a function for transmitting, to the MPR image generating unit 58, an instruction of generating the MPR image data with, e.g., the scaling rate as it is, in the designating direction, of the same horizontal width as the horizontal width of a display pane for displaying the MPR image, of which the center is on the designated display position, upon receiving, from the first display control unit 90, a determining result that the horizontal width of the MPR image is wider than the horizontal width of the display pane for displaying the MPR image; and a function for displaying the tomographic observation screen by transmitting, to the display unit 54, tomographic observation screen information including, as components, the MPR image data generated in accordance with the instruction by the MPR image generating unit 58.

On the contrary, the second display control unit 91 has: a function for transmitting, to the MPR image generating unit 58, an instruction of generating the MPR image data by adjusting the scaling rate so that the horizontal width of the MPR image in an arbitrary direction is the same one as that of the display pane of the MPR image on the tomographic observation screen, upon receiving, from the first display control unit 90, the determining that the horizontal width of the MPR image is narrower than the horizontal width of the display pane for displaying the MPR image; and a function for displaying the tomographic observation screen by transmitting, to the display unit 54, the tomographic observation screen information having the MPR image data, as a component, generated by the MPR image generating unit 58 in accordance with the instruction.

Next, a description is given of the motion and the operation of the image display apparatus 34C.

In the image display apparatus 34C, in accordance with the same flow as that shown in FIG. 2, the axial image data is generated from the thin-slice image data and the generated axial image data is displayed. However, the display unit 54 displays the MPR image in step S3 shown in FIG. 2 and, thereafter, the scaling rate of the MPR image can be changed and the tomographic observation screen can be displayed, as an auxiliary screen.

Figure 11:
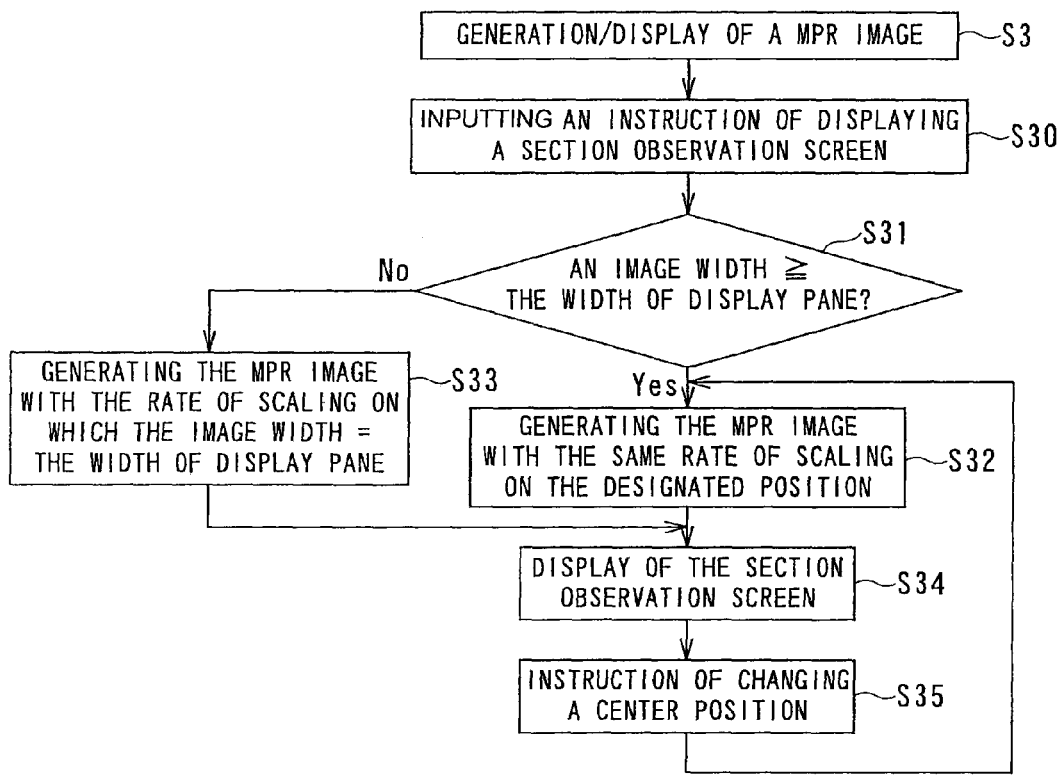
FIG. 11 is a flowchart showing the flow for displaying the tomographic observation screen on the display unit in the image display apparatus shown in FIG. 10.

FIG. 11 is a flowchart showing the flow for displaying the tomographic observation screen on the display unit 54 in the image display apparatus 34C shown in FIG. 10. Reference numerals having numbers added to reference symbol S denote steps in the flowchart shown in FIG. 11.

First, in step S3, the MPR image is displayed on the display unit 54.

Subsequently, in step S30, the input unit 53 inputs an instruction of displaying the tomographic observation screen to the first display control unit 90.

Subsequently, in step S31, the first display control unit 90 determines whether or not the horizontal width of the MPR image in the axial cross-sectional direction is wider than the horizontal width of the display pane for displaying the MPR image on the display unit 54.

Figure 12:
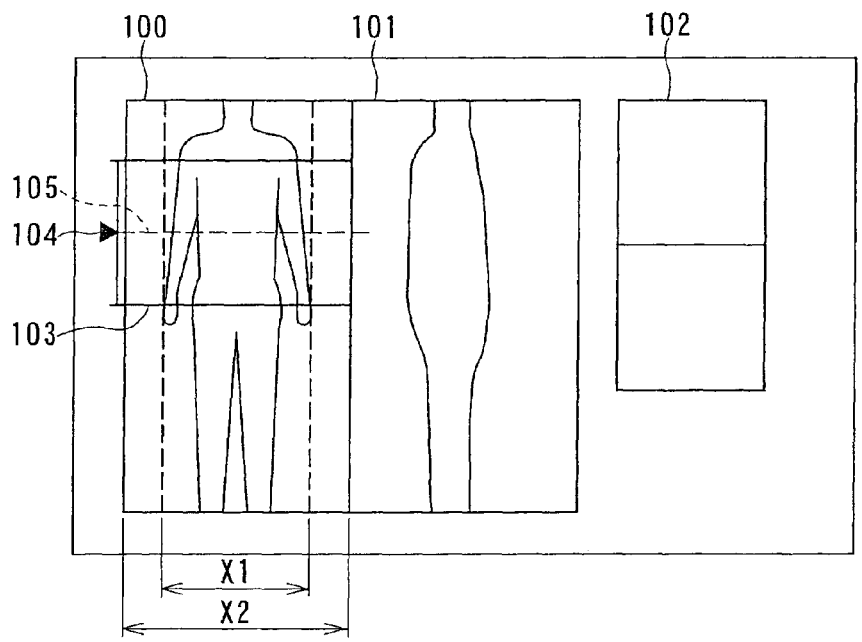
FIG. 12 is a diagram explaining relationship between a horizontal width of the MPR image and that of the display pane which are displayed on the display unit of the image display apparatus shown in FIG. 10.

FIG. 12 is a diagram explaining relationship between a horizontal width of the MPR image and that of the display pane which are displayed on the display unit 54 of the image display apparatus 34C shown in FIG. 10.

Referring to FIG. 12, the display unit 54 displays a display pane 100 of the coronal image, a display pane 101 of the sagittal image, and a display pane 102 of the axial image. The coronal image, the sagittal image, and the axial image are displayed on the inside of the display pane 100 of the coronal image, the display pane 101 of the sagittal image, and the display pane 102 of the axial image respectively. In general, since the coronal image and the sagittal image are long in the vertical direction, the display pane 100 of the coronal image and the display pane 101 of the sagittal image are long in the vertical direction.

The first display control unit 90 determines whether or not a horizontal width X1 of the coronal image is wider than a horizontal width X2 of the display pane 100 of the coronal image. FIG. 12 shows an example in which the horizontal width X1 of the coronal image is narrower than the horizontal width X2 of the display pane 100 of the coronal image. For example, the coronal image displays therein a solid line 103 indicating the position of the display pane and a triangle symbol 104 and a dotted line 105 indicating the center position, upon displaying the coronal image on the tomographic observation screen.

The first display control unit 90 transmits, to the second display control unit 91, a determining result indicating whether or not the horizontal width of the MPR image is wider than the horizontal width of the display pane of the MPR image.

Subsequently, in step S32, when the horizontal width of the MPR image is wider than the horizontal width of the display pane of the MPR image, the second display control unit 91 transmits, to the MPR image generating unit 58, an instruction of generating the MPR image data, of which the centers are on the designated display position, in four directions with the same horizontal and vertical widths as those of the display pane for displaying the MPR image on the same scaling rate. The MPR image generating unit 58 generates the MPR image data used for displaying the tomographic observation screen in accordance with the instruction.

On the other hand, in step S33, when the horizontal width of the MPR image is narrower than the horizontal width of the display pane of the MPR image, the second display control unit 91 transmits, to the MPR image generating unit 58, an instruction of generating the MPR image data with adjusting the scaling rate so that the horizontal widths of the MPR images in four directions are equal to the width of the display pane of the MPR image on the tomographic observation screen. The MPR image generating unit 58 generates the MPR image data used for displaying the tomographic observation screen in accordance with the instruction.

Subsequently, in step S34, the MPR image generating unit 58 transmits the MPR image data to the second display control unit 91. The second display control unit 91 transmits, to the display unit 54, the tomographic observation screen information having the MPR image data, as a component, thereby displaying the tomographic observation screen.

Figure 13:
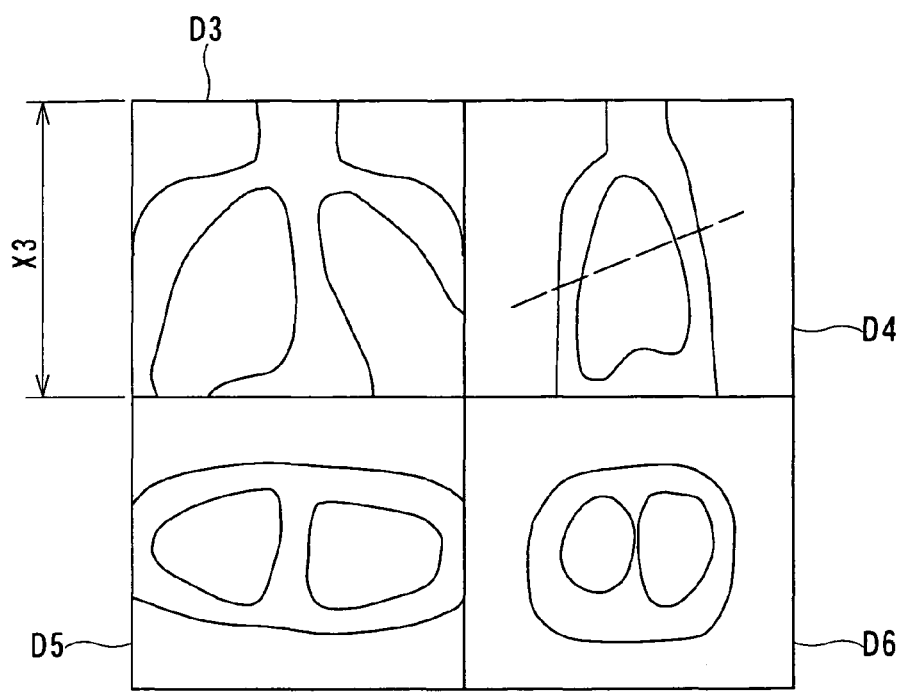
FIG. 13 is a diagram showing an example of tomographic observation screen displayed on the display unit of the image display apparatus shown in FIG. 10.

FIG. 13 is a diagram showing an example of tomographic observation screen displayed on the display unit 54 of the image display apparatus 34C shown in FIG. 10.

Referring to FIG. 13, the tomographic observation screen displays a coronal image D3, a sagittal image D4, an axial image D5, and an oblique image D6. The sagittal image D4 displays thereon a cross-sectional direction of the oblique image DG with a dotted line segment.

In this state, the operation of the input unit 53 can change the center positions of the coronal image D3, the sagittal image D4, the axial image D5, and the oblique image D6 which are displayed on the tomographic observation screen.

In this case, in step S35, the first display control unit 90 receives an instruction of changing a center position of the MPR image displayed on the tomographic observation screen from the input unit 53, such as a mouse. Further, in this case, the first display control unit 90 can receive the instruction of changing the center position of the MPR image by scrolling a figure for setting the center position of the tomographic observation image while referring to the coronal image transmitted and displayed on the display unit 54 from the first display control unit 90.

Figure 14:
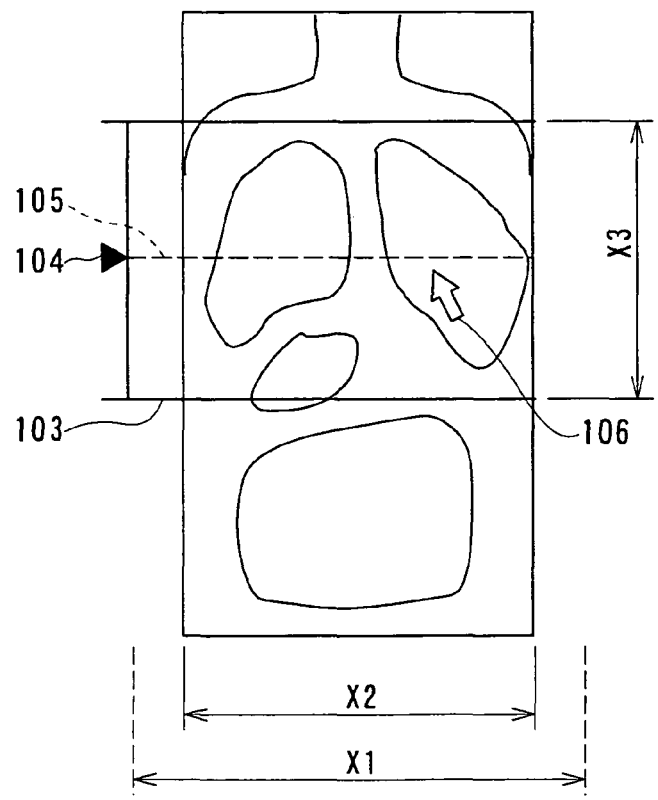
FIG. 14 is a diagram showing an example in case of changing the center position of the MPR image displayed on the tomographic observation screen through the coronal image displayed on the display unit of the image display apparatus shown in FIG. 10.
Figure 15:
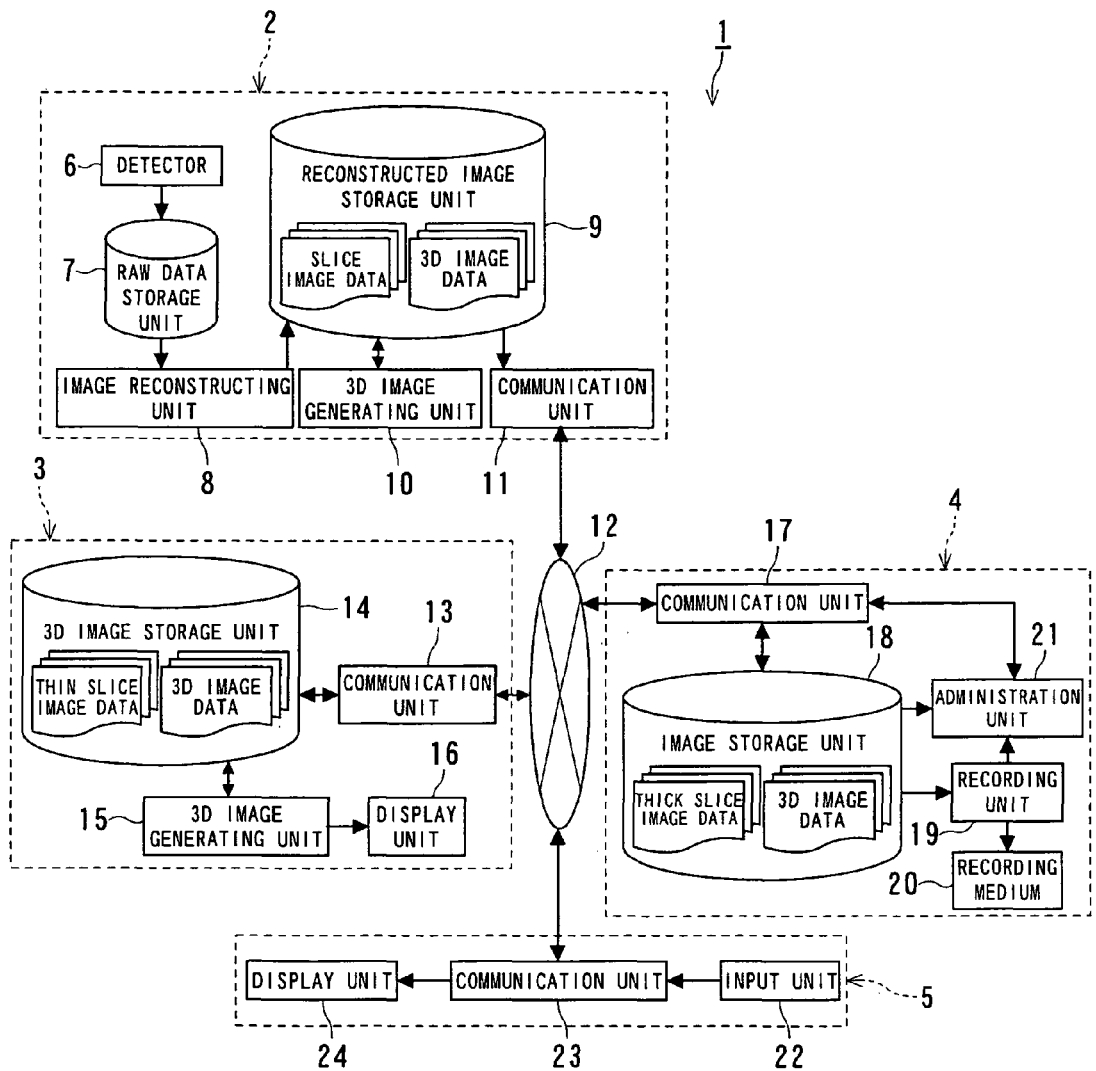
FIG. 15 is a block diagram of a conventional X-ray CT image diagnostic display system.

FIG. 14 is a diagram showing an example in case of changing the center position of the MPR image displayed on the tomographic observation screen through the coronal image displayed on the display unit 54 of the image display apparatus 34C shown in FIG. 10.

Referring to FIG. 14, the coronal image displayed on the display unit 54 displays a solid line segment 103 indicating the display pane of the tomographic observation image and a dotted line segment 105 indicating the center position. A triangle symbol 104 and an arrow symbol 106 for changing the center position are overlaid and displayed. Note that FIG. 14 shows an example in which the horizontal width of the MPR image is wider than the horizontal width of the display pane of the MPR image. Further, in this case, the range X3 between the solid lines 103 indicating the display pane of the tomographic observation image becomes the display range X3 of the coronal image on the tomographic observation screen.

With the operation of the input unit 53, such as a mouse, the triangle symbol 104 and the arrow symbol 106 are scrolled, thereby inputting an instruction of changing the display range and the center position of the coronal image to the first display control unit 90. Therefore, the first display control unit 90 transmits, to the MPR image generating unit 58, an instruction of generating a desired MPR image data of which the center is on the changed center position.

In step S32, the MPR image data after the changing operation is generated again. In step S33, the tomographic observation screen displays the re-generated MPR image, such as the coronal image.

That is, in the above-mentioned the image display apparatus 34C, the display unit 54 can display the MPR image, e.g., the coronal image and the sagittal image with a desired scaling rate. Further, when the width of the MPR image in the horizontal direction toward the display unit 54 is wider than that of the display pane in the horizontal direction, an MPR image with an aspect ratio (1:1) can be additionally displayed, or can be switched to be displayed on the display unit 54.

Therefore, with the image display apparatus 34C, even when the horizontal width of the coronal image or the sagittal image is wider than the horizontal width of the display pane and is long in the vertical direction, the coronal image and the sagittal image can be enlarged and be displayed within an observation-target range. Thus, the continuous observation can be performed with freely changing the range of the MPR image displayed on the tomographic observation screen while referring to the coronal image and the sagittal image which are long in the vertical direction.

Note that the X-ray CT-image diagnostic display systems 30, 30A, 30B, and 30C and the image display devices 34, 34A, 34B, and 34C according to above-mentioned embodiments may be mutually combined. Further, the components and the functions thereof may be partly omitted.

The MPR image to be displayed is the axial image. However, in order to display the MPR image in another direction (first direction) other than the axial cross-sectional direction, the MPR image in a second direction different from the first direction may be used for reference.

What is claimed is:

1. An image display apparatus comprising:
   a reference image display unit configured to display a reference image on a display unit;
   an acquired image storage unit configured to store slice image data;
   a setting unit configured to set a display range of tomographic images in a first direction, and either of a number of the tomographic images in the first direction to be displayed or a thickness of the tomographic images in the first direction to three-dimensional image data including image data corresponding to a plurality of slices, in accordance with the reference image and instruction information from an input unit;
   an image generating unit configured to generate either of the tomographic images having the set thickness in the first direction or the set number of the tomographic images in the first direction using the slice image data which are stored in the acquired image storage unit and which correspond to the display range set by the setting unit;
   a tomographic image display unit configured to display the generated tomographic images in the first direction;
   a determining unit configured to determine whether or not thin-slice image data sufficient to generate the tomographic images is stored in the acquired image storage unit by determining:
   (a) whether or not the acquired image storage unit stores the thin-slice image data with the slice thickness thereof thinner than that of the tomographic image,
   (b) whether or not the acquired image storage unit stores the thin-slice image data within an entire observation range or a part of an observation range, or
   (c) whether or not the tomographic image can be generated from the thin-slice image data stored in the acquired image storage unit upon generating the tomographic image with a designated scaling rate, or upon designating an oblique cross-section and generating the tomographic image; and
   an image reconstruction instructing unit configured to transmit, when it is determined, by the determining unit, that sufficient thin-slice image data is not stored in the acquired image storage unit, an instruction to construct necessary slice image data for generating the tomographic images from raw data, to an image reconstructing apparatus, the image reconstructing apparatus being connected externally via a network,
   the image reconstructing apparatus to transmit the reconstructed slice image data, in response to the instruction, to be stored in the acquired image storage unit.

2. An image display apparatus having an input unit and a display unit comprising:
   a reference image display unit configured to display a reference image on the display unit;
   an observation range designating unit configured to designate a display range of tomographic images in a first direction to the display unit in accordance with instruction information from the input unit and the reference image;
   a number-of-image designating unit configured to designate either of a number of the tomographic images in the first direction to be displayed or a thickness of the tomographic images in the first direction in accordance with other instruction information from the input unit;
   an acquired image storage unit configured to store slice image data;
   a slab image generating unit configured to display the tomographic images in the first direction by generating slab image data having a required thickness so as to generate either of tomographic image data having the thickness designated by the number-of-image designating unit or the number designated by the number-of-image designating unit of tomographic image data in the first direction in the display range using the slice image data which are stored in the acquired image storage unit and which correspond to the display range set by the observation range designating unit and giving the generated slab image data to the display unit;
   a determining unit configured to determine whether or not thin-slice image data sufficient to generate the tomographic images is stored in the acquired image storage unit by determining:
   (a) whether or not the acquired image storage unit stores the thin-slice image data with the slice thickness thereof thinner than that of the tomographic image,
   (b) whether or not the acquired image storage unit stores the thin-slice image data within an entire observation range or a part of an observation range, or
   (c) whether or not the tomographic image can be generated from the thin-slice image data stored in the acquired image storage unit upon generating the tomographic image with a designated scaling rate, or upon designating an oblique cross-section and generating the tomographic image; and
   an image reconstruction instructing unit configured to transmit, when it is determined, by the determining unit, that sufficient thin-slice image data is not stored in the acquired image storage unit, an instruction to reconstruct necessary slice image data for generating the slab image data from raw data, to an image reconstructing apparatus, the image reconstructing apparatus being connected externally via a network,
   the image reconstructing apparatus to transmit the reconstructed slice image data, in response to the instruction, to be stored in the acquired image storage unit.

3. An image display apparatus according to claim 2, wherein the slab image generating unit is configured to display axial images by generating the slab image data so as to generate either of axial image data having the thickness designated by the number-of-image designating unit or the number designated by the number-of-image designating unit of axial image data in the display range and giving the generated slab image data to the display unit.

4. An image display apparatus according to claim 2, wherein the reference image display unit is configured to display a tomographic image in a second direction which is different from the first direction as the reference image on the display unit by performing section conversion processing to a plurality of slice image data to generate tomographic image data and giving the generated tomographic image data to the display unit.

5. An image display apparatus according to claim 2, wherein the reference image display unit is configured to display a scanogram as the reference image on the display unit.

6. An image display apparatus according to claim 2, wherein the observation range designating unit is configured to be able to give image data for designating the display range to the display unit to be displayed on the display unit and designate the display range by scroll of the input unit.

7. An image display apparatus according to claim 2,
wherein the number-of-image designating unit is configured to be able to give image data for designating either of the number or the thickness to the display unit to be displayed on the display unit and designate at least one of the number and the thickness by scroll of the input unit.

8. An image display apparatus according to claim 2,
wherein the image reconstruction instructing unit is further configured to transmit an instruction to reconstruct the slice image data having a desired thickness to the image reconstructing apparatus when the acquired image storage unit does not store the slice image data with the slice thickness thinner than ½ of that of a slab image to be generated.

9. An image display apparatus according to claim 2,
wherein the image reconstruction instructing unit is further configured to transmit the instruction to construct the necessary slice image data for generating the slab image data to the image reconstructing unit of an X-ray CT apparatus when the acquired image storage unit does not store the sufficient slice image data for generating the slab image data.

10. An image display apparatus according to claim 8,
wherein the image reconstruction instructing unit is further configured to transmit the instruction to an image reconstructing unit of an X-ray CT apparatus.

11. An image display apparatus according to claim 2, further comprising:
an image data reception unit configured to receive slice image data reconstructed by the image reconstructing unit.

12. An image display apparatus according to claim 8, further comprising:
an image data reception unit configured to receive slice image data reconstructed by the image reconstructing unit.

13. An image display apparatus according to claim 2,
wherein the image reconstruction instructing unit is further configured to transmit a destination of a transmission of the necessary slice image data reconstructed according to the instruction to the image reconstructing apparatus.

14. An image display apparatus according to claim 8,
wherein the image reconstruction instructing unit is further configured to transmit a destination of a transmission of the slice image data having the desired thickness reconstructed according to the instruction to the image reconstructing apparatus.

15. An image display apparatus according to claim 2, further comprising:
a slice thickness storage unit configured to store thicknesses of slab image data to be generated, the thicknesses being associated with observation parts of an object respectively,
wherein the number-of-image designating unit is configured to designate a corresponding thickness of slab image data associated with an observation part as the thickness of the tomographic images in the first direction by referring the slice thickness storage unit when the number-of-image designating unit receives an instruction of the observation part from the input unit.

16. An image display apparatus according to claim 2, further comprising:
a display condition storage unit configured to store display condition information which is composed of display ranges of tomographic images in the first direction and image conditions associated with the display ranges respectively; and
a display condition retrieving unit configured to acquire past display condition information regarding an observation part from the display condition storage unit to be given to the slab image generating unit when the display condition retrieving unit receives an instruction of the observation part from the input unit,
wherein the slab image generating unit is configured to generate the slab image data on a same display condition as a past one according to the past display condition information given from the display condition retrieving unit.

17. An image display apparatus according to claim 2, further comprising:
a display condition storage unit configured to store display condition information which is composed of display ranges of tomographic images in the first direction and image conditions associated with the display ranges respectively; and
a display condition retrieving unit configured to acquire last display condition information from the display condition storage unit to be given to the slab image generating unit when the display condition retrieving unit receives an instruction for retrieving a past display condition from the input unit,
wherein the slab image generating unit is configured to generate the slab image data on a same display condition as a past one according to the last display condition information given from the display condition retrieving unit.

18. An image display apparatus according to claim 2, further comprising:
a related image retrieving unit configured to acquire related image data using identification information of a related image associated with interpretation report information; and
an image condition extracting unit configured to extract an image condition incidental to the related image data acquired by the related image retrieving unit and give the extracted image condition to the slab image generating unit,
wherein the slab image generating unit is configured to generate the slab image data according to the image condition given from the image condition extracting unit.

19. An image display apparatus according to claim 2, further comprising:
a reference image generating unit configured to generate the reference image; and
a display control unit configured to give an instruction for generating tomographic image data in a designated direction to the reference image generating unit and give tomographic observation screen information including the tomographic image data generated by the reference image generating unit in accordance with the instruction to the display unit to make a tomographic observation screen for displaying a tomographic image in an arbitrary direction displayed when the display control unit receives a display instruction of the tomographic observation screen from the input unit, a center of the tomographic image data in the designated direction being a designated display position.

20. An image display apparatus according to claim 19,
wherein the display control unit is configured to make the reference image displayed with a scaling rate as it is when a width of the reference image is wider than that of a display pane for displaying the reference image on the tomographic observation screen.

21. An image display apparatus according to claim 19, wherein the display control unit is configured to adjust a scaling rate of the reference image so as to match a width of the reference image displayed on the tomographic observation screen to a width of a display pane for displaying the reference image on the tomographic observation screen when the width of the reference image is narrower than that of the display pane.

22. An image display apparatus according to claim 19, wherein the display control unit is configured to able to change a display position of the tomographic image in the arbitrary direction displayed on the tomographic observation screen by a scroll of the input unit.

23. An image display method comprising:

displaying a reference image on a display unit;

storing slice image data in an acquired image storage unit;

setting a display range of tomographic images in a first direction, and either of a number of the tomographic images in the first direction to be displayed or a thickness of the tomographic images in the first direction to three-dimensional image data including image data corresponding to a plurality of slices, in accordance and the reference image and instruction information from an input unit;

generating either of the tomographic images having the set thickness in the first direction or the set number of the tomographic images in the first direction using the stored slice image data corresponding to the set display range;

displaying the generated tomographic images in the first direction;

determining, by a determining unit, whether or not thin-slice image data sufficient to generate the tomographic images is stored in the acquired image storage unit by determining:

(a) whether or not the acquired image storage unit stores the thin-slice image data with the slice thickness thereof thinner than that of the tomographic image, (b) whether or not the acquired image storage unit stores the thin-slice image data within an entire observation range or a part of an observation range, or (c) whether or not the tomographic image can be generated from the thin-slice image data stored in the acquired image storage unit upon generating the tomographic image with a designated scaling rate, or upon designating an oblique cross-section and generating the tomographic image; and transmitting, when it is determined, by the determining in the determining unit, that sufficient thin-slice image data is not stored in the acquired image storage unit, an instruction to reconstruct necessary slice image data for generating the tomographic images from raw data, to an image reconstructing apparatus, the image reconstructing apparatus being connected externally via a network; and transmitting, by the image reconstructing apparatus, the reconstructed slice image data, in response to the instruction, to be stored in the acquired image storage unit.

24. An image display method comprising:

displaying a reference image on a display unit;

designating a display range of tomographic images in a first direction to the display unit in accordance with instruction information from an input unit and the reference image;

designating either of a number of the tomographic images in the first direction to be displayed or a thickness of the tomographic images in the first direction in accordance with other instruction information from the input unit;

storing slice image data in an acquired image storage unit;

displaying the tomographic images in the first direction by generating slab image data having a required thickness so as to generate either of tomographic image data having the designated thickness or the designated number of tomographic image data in the first direction in the designated display range using the stored slice image data in the designated display range and giving the generated slab image data to the display unit;

determining, by a determining unit, whether or not thin-slice image data sufficient to generate the tomographic images is stored in the acquired image storage unit by determining:

(a) whether or not the acquired image storage unit stores the thin-slice image data with the slice thickness thereof thinner than that of the tomographic image, (b) whether or not the acquired image storage unit stores the thin-slice image data within an entire observation range or a part of an observation range, or (c) whether or not the tomographic image can be generated from the thin-slice image data stored in the acquired image storage unit upon generating the tomographic image with a designated scaling rate, or upon designating an oblique cross-section and generating the tomographic image;

transmitting, when it is determined, by the determining in the determining unit, that sufficient thin-slice image data is not stored in the acquired image storage unit, an instruction to reconstruct necessary slice image data for generating the slab image data from raw data, to an image reconstructing apparatus, the image reconstructing apparatus being connected externally via a network; and transmitting, by the image reconstructing apparatus, the reconstructed slice image data, in response to the instruction, to be stored in the acquired image storage unit.

25. An image display method according to claim 24, wherein axial images are displayed by generating the slab image data so as to generate either of axial image data having the designated thickness or the designated number of axial image data in the display range and giving the generated slab image data to the display unit.

26. An image display method according to claim 24, wherein a tomographic image in a second direction which is different from the first direction is displayed as the reference image on the display unit by performing section conversion processing to a plurality of slice image data to generate tomographic image data and giving the generated tomographic image data to the display unit.

27. An image display method according to claim 24, wherein a scanogram is displayed as the reference image on the display unit.

28. An image display method according to claim 24,
wherein image data for designating the display range is given to the display unit to be displayed on the display unit so as to be able to designate the display range by scroll of the input unit.

29. An image display method according to claim 24,
wherein image data for designating either of the number or the thickness is given to the display unit to be displayed on the display unit so as to be able to designate at least one of the number and the thickness by scroll of the input unit.

30. An image display method according to claim 24,
wherein the transmitting further includes transmitting the instruction to reconstruct the slice image data having a desired thickness to the image reconstructing apparatus when the slice image data with the slice thickness thinner than ½ of that of a slab image to be generated are not stored.

31. An image display method according to claim 24,
wherein the transmitting further includes transmitting the instruction to reconstruct the necessary slice image data for generating the slab image data to the image reconstructing unit of an X-ray CT apparatus when the sufficient slice image data for generating the slab image data are stored.

32. An image display method according to claim 30,
wherein the transmitting further includes transmitting the instruction to an image reconstructing unit of an X-ray CT apparatus.

33. An image display method according to claim 24, further comprising:
receiving slice image data reconstructed by the image reconstructing unit.

34. An image display method according to claim 30, further comprising:
receiving slice image data reconstructed by the image reconstructing unit.

35. An image display method according to claim 24,
wherein the transmitting further includes transmitting a destination of a transmission of the necessary slice image data reconstructed according to the instruction to the image reconstructing apparatus.

36. An image display method according to claim 30,
wherein the transmitting further includes transmitting a destination of a transmission of the slice image data having the desired thickness reconstructed according to the instruction to the image reconstructing apparatus.

37. An image display method according to claim 24, further comprising:
storing thicknesses of slab image data to be generated, the thicknesses being associated with observation parts of an object respectively,
wherein a corresponding thickness of slab image data associated with an observation part is designated as the thickness of the tomographic images in the first direction when an instruction of the observation part is received from the input unit.

38. An image display method according to claim 24, further comprising:
storing display condition information which is composed of display ranges of tomographic images in the first direction and image conditions associated with the display ranges respectively; and
acquiring past display condition information regarding an observation part when an instruction of the observation part is received from the input unit,
wherein the slab image data is generated on a same display condition as a past one according to the acquired past display condition information.

39. An image display method according to claim 24, further comprising:
storing display condition information which is composed of display ranges of tomographic images in the first direction and image conditions associated with the display ranges respectively; and
acquiring last display condition information when an instruction for retrieving a past display condition is received from the input unit,
wherein the slab image data is generated on a same display condition as a past one according to the acquired last display condition information.

40. An image display method according to claim 24, further comprising:
acquiring related image data using identification information of a related image associated with interpretation report information; and
extracting an image condition incidental to the acquired related image data
wherein the slab image data is generated according to the extracted image condition.

41. An image display method according to claim 24, further comprising:
generating tomographic image data in a designated direction and giving tomographic observation screen information including the tomographic image data to the display unit to make a tomographic observation screen for displaying a tomographic image in an arbitrary direction displayed when a display instruction of the tomographic observation screen is given from the input unit, a center of the tomographic image data in the designated direction being a designated display position.

42. An image display method according to claim 41,
wherein the reference image is displayed with a scaling rate as it is when a width of the reference image is wider than that of a display pane for displaying the reference image on the tomographic observation screen.

43. An image display method according to claim 41,
wherein a scaling rate of the reference image is adjusted so as to match a width of the reference image displayed on the tomographic observation screen to a width of a display pane for displaying the reference image on the tomographic observation screen when the width of the reference image is narrower than that of the display pane.

44. An image display method according to claim 41,
wherein a display position of the tomographic image in the arbitrary direction displayed on the tomographic observation screen is to be changeable by a scroll of the input unit.

* * * * *